Feb. 14, 1950   J. B. ARMITAGE ET AL   2,497,842
MACHINE TOOL TRANSMISSION AND CONTROL MECHANISM
Filed Jan. 22, 1944   7 Sheets-Sheet 1

INVENTORS
JOSEPH B. ARMITAGE
THEODORE F. ESERKALN
THEODORE A. WETZEL
BY: W. D. O'Connor
ATTORNEY Feb. 14, 1950     J. B. ARMITAGE ET AL     2,497,842
MACHINE TOOL TRANSMISSION AND CONTROL MECHANISM
Filed Jan. 22, 1944     7 Sheets-Sheet 2

INVENTORS
JOSEPH B. ARMITAGE
THEODORE F. ESERKAIN
THEODORE A. WETZEL
BY W. D. O'Connor
ATTORNEY Feb. 14, 1950 J. B. ARMITAGE ET AL 2,497,842
MACHINE TOOL TRANSMISSION AND CONTROL MECHANISM
Filed Jan. 22, 1944 7 Sheets-Sheet 3

INVENTORS
JOSEPH B. ARMITAGE
THEODORE F. ESERKALN
THEODORE A. WETZEL
BY W. D. O'Connor
ATTORNEY Feb. 14, 1950 J. B. ARMITAGE ET AL 2,497,842
MACHINE TOOL TRANSMISSION AND CONTROL MECHANISM
Filed Jan. 22, 1944 7 Sheets-Sheet 4

INVENTORS
JOSEPH B ARMITAGE
THEODORE F. ESERKALN
THEODORE A. WETZEL
BY W. D. O'Connor
ATTORNEY

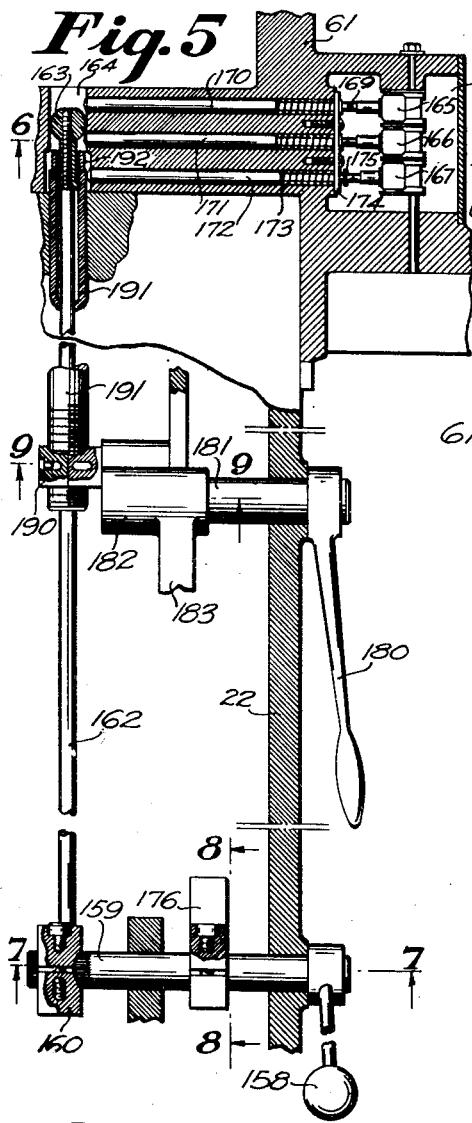

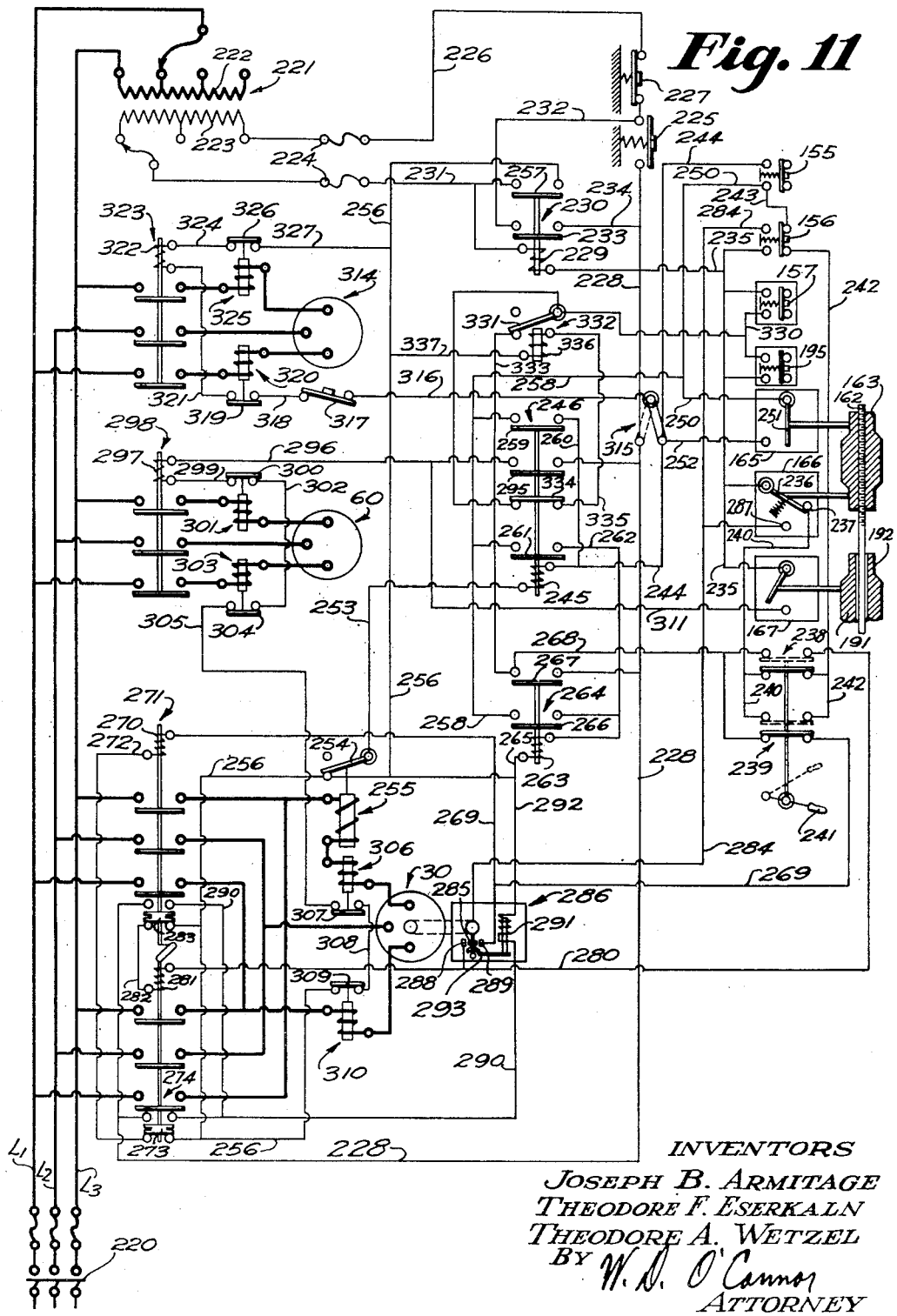

Patented Feb. 14, 1950

2,497,842

UNITED STATES PATENT OFFICE 2,497,842

MACHINE TOOL TRANSMISSION AND CONTROL MECHANISM

Joseph B. Armitage and Theodore F. Eserkaln, Wauwatosa, and Theodore A. Wetzel, Milwaukee, Wis., assignors to Kearney & Trecker Corporation, West Allis, Wis., a corporation of Wisconsin Application January 22, 1944, Serial No. 519,366

28 Claims. (Cl. 90—18)

This invention relates, generally, to machine tools and more particularly to power actuating and controlling apparatus for a machine tool.

A general object of the invention is to provide improved power driving and controlling apparatus for movable machine tool working elements.

Another object of the invention is to provide an improved driving and controlling arrangement for the interacting work and cutter carrying elements of a milling machine.

Another object is to provide a machine tool having an adjustable speed changing transmission mechanism and a driving motor together with means for energizing the driving motor for a predetermined limited time to effect a jogging movement of the transmission mechanism for facilitating its adjustment.

Another object is to provide, in connection with a machine tool having an adjustable transmission mechanism and a driving motor, inching switch means for energizing the motor to facilitate adjustment of the transmission mechanism and having associated therewith a time limit switch arranged to limit the duration of motor energization.

Another object is to provide an improved arrangement for adjusting speed changing mechanism whereby the motor driving the mechanism is energized to turn it for facilitating adjustment and is de-energized at the expiration of a predetermined time period to prevent overspeeding.

Another object is to provide an improved speed changing apparatus in which the driving motor is energized for a predetermined period of time upon the initiation of a speed changing movement to jog the mechanism for facilitating its adjustment.

Another object is to provide a machine tool driving mechanism including an electric motor and a controller for the motor so arranged that movement of the controller from its running position de-energizes the motor and a further movement to a braking position results in effecting an electrical braking action upon the motor.

Another object is to provide a machine tool driving mechanism including an electric motor together with electrical braking means for the motor and control means arranged to adjust the braking action.

Another object is to provide in a milling machine separate motors for driving the spindle and the work support so interlocked that the spindle motor and feed motor start simultaneously and both motors stop upon effecting reversal of the spindle motor.

Another object is to provide an improved control system for a milling machine so arranged that the motor for effecting the work feeding movement will be de-energized automatically upon actuation of the reversing control for the spindle driving motor.

Another object is to provide a machine tool having a spindle driving motor and a feed actuating motor, with a reversing switch for changing the direction of rotation of the spindle motor and spindle together with interlocking means arranged to de-energize both motors upon movement of the reversing switch in a reversing action.

Another object is to provide a milling machine of the knee type having a separate feeding motor mounted on the knee and interlocked with the spindle driving motor in manner to prevent feeding movement when the spindle is not operating, together with control means for energizing the knee motor when the rapid traverse driving means is engaged.

A further object is to provide in a milling machine of the knee type a spindle motor mounted in the machine column and a feed motor mounted on the knee, together with interlocking control means whereby the feed motor on the knee will be deenergized upon the occurrence of an overload in the spindle motor.

According to this invention, a milling machine of the knee and column type is provided with one motor mounted in the column for driving the spindle and a separate motor mounted on the knee for actuating the work supporting members. The spindle driving motor is arranged to be reversed for reversing the direction of spindle rotation and is electrically interconnected with the feed motor in such manner that both motors are started simultaneously and the feed motor is stopped upon the occurrence of an overload in the spindle motor or upon movement of a control element to effect reversal of the spindle motor. After a reversal, both motors may be started simultaneously, as before, the spindle motor turning in reverse direction while the feed motor turns in its normal direction of rotation. Upon moving a stopping switch, both motors may be de-energized while a further movement of the switch will result in applying electrical braking to the spindle motor. For facilitating the adjustment of the spindle transmission, the spindle motor may be energized momentarily to effect jogging of the gearing in the transmission, a time limiting relay being provided for preventing excessive speed in the transmission while it is being adjusted. Rapid traverse movement of the work supporting members is effected by the separate feeding motor, an electrical interlock being provided for starting the motor upon engagement of the rapid traverse drive mechanism. A motor-driven pump for supplying coolant is arranged to be operated either independently or in association with the spindle motor.

The foregoing and other objects of this invention, which will become more fully apparent from the following detailed description, may be achieved by the particular machine tool depicted in and described in connection with the accompanying drawing, in which:

Fig. 5 is a fragmentary detailed view taken largely in horizontal section through the right side of the knee along the line 5—5 in Fig. 3 and showing some of the apparatus for controlling movements of the machine elements;

Fig. 6 is another fragmentary view taken largely in vertical section along the lines 6—6 of Figs. 3 and 5 and showing the driving connection of the feeding motor;

Fig. 7 is a fragmentary view in vertical section of a centering detent taken along the lines 7—7 in Figs. 3 and 5;

Fig. 8 is another fragmentary view of the detent mechanism taken along the line 8—8 of Fig. 7;

Fig. 9 is a fragmentary detailed view of part of the control linkage taken in vertical section along the line 9—9 in Fig. 5;

Fig. 11 is a schematic circuit diagram of the electrical system for energizing and controlling the operating motors of the machine.

Figure 1:
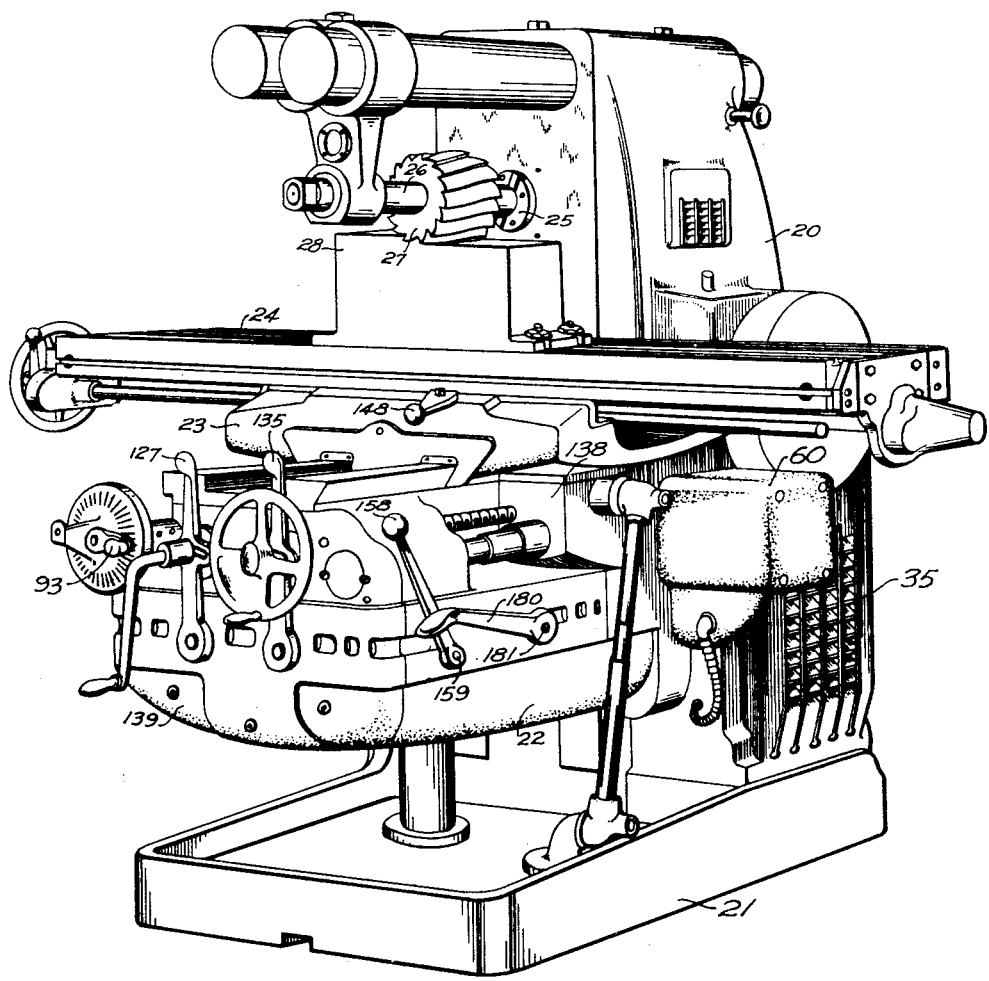
Figure 1 is a perspective view of a milling machine of the horizontal spindle, knee and column type incorporating the novel features of the present invention.

The machine tool shown generally in Fig. 1 of the drawing as exemplifying a preferred embodiment of the invention is a milling machine of the horizontal spindle, knee and column type, it being understood that the various features of the invention may be incorporated in and utilized to advantage in other machines of different construction.

Referring more specifically to the drawing and particularly to Fig. 1 thereof, the milling machine there shown comprises essentially an upright hollow column 20 formed integrally with a forwardly extending base 21 to constitute a supporting frame structure for the cooperating work supporting and tool supporting members of the machine.

The work supporting member of the machine includes a knee structure 22 that is movably mounted on the front face of the column 20 for vertical sliding adjustment and that carries upon its top surface a saddle structure 23 which is slidably mounted thereon for horizontal transverse movement toward or from the column. The saddle structure 23 in turn supports a work supporting table 24 that is slidably mounted thereon for horizontal longitudinal movement, the sliding actions between the knee, saddle and table being such that a work piece mounted on the table may be moved along any one of three mutually transverse paths.

The tool supporting member of the machine is constituted by a horizontally disposed spindle 25 that is rotatably journalled in the upper part of the column 20 with its tool receiving end extending from the front of the column in cooperating relationship with the table 24. An arbor 26 that is received in the spindle carries a milling cutter 27 arranged to operate in well-known manner upon a work piece 28 carried by the work supporting table 24.

Figure 2:
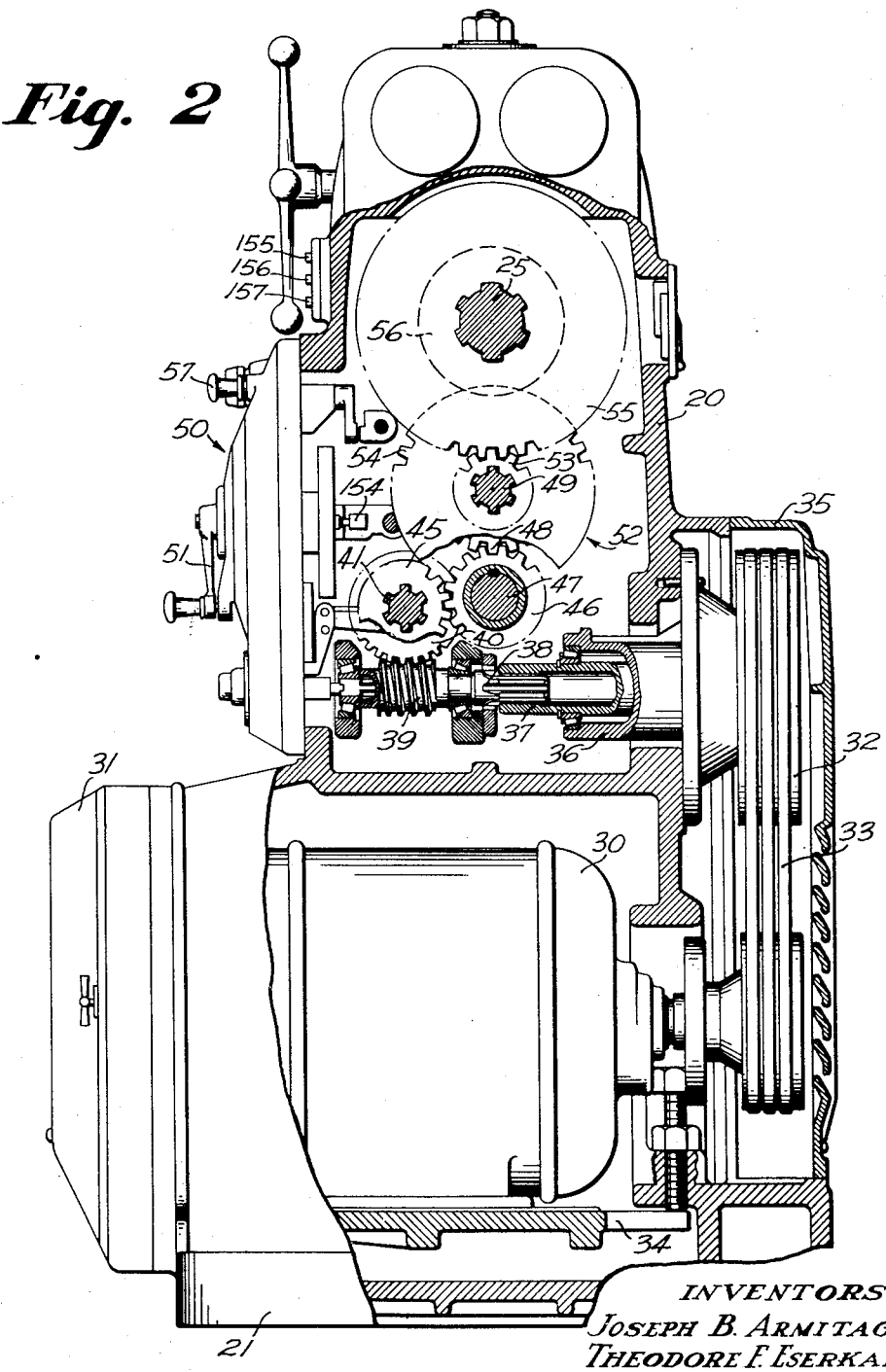
Fig. 2 is a view in vertical section through the column of the machine shown in Fig. 1, taken transversely of the spindle and showing the spindle driving transmission mechanism.

Power for driving the rotatably mounted cutter spindle 25 is derived from an electric motor 30 that is mounted transversely of the column 20 in the base thereof as shown in Fig. 2, the motor being accessible by opening a hinged door 31. The driving power is transmitted from the motor to a main driving pulley 32 rotatably mounted on the right side of the column 20 above the motor, by means of connecting multiple belts 33. As shown, the motor 30 is mounted on an adjustable motor base plate 34 which may be moved to regulate the tension of the belts. The main driving pulley 32 and the belts 33 are protected by a louvered door 35 which may be opened to afford access to them.

The main driving pulley 32 is rotatably supported by a pulley bracket 36 which is bolted to the side of the column. A hollow drive shaft 37 integrally formed with the pulley 32 extends transversely into the lower mid-portion of the column 20, as is shown in Fig. 2. Internal splines within the inner end of the hollow shaft 37 mesh with corresponding splines on the extending end of a shaft 38, the two shafts being in axial alignment with each other. A worm 39, journalled within the column, is internally splined to receive the other end of the splined shaft 38, whereby the power is transmitted directly from the pulley 32 to the worm 39. A worm wheel 40, splined to a primary transmission shaft 41, meshes with the worm 39 and serves to transmit power through a right angle to a speed changing transmission mechanism contained within the upper portion of the upright column 20.

The speed changing transmission mechanism is designed to effect rotation of the spindle 25 at any one of sixteen predetermined speeds. Two axialy shiftable gear couplets are splined on the primary shaft 41 with two gears on each couplet.

Of the four gears on the two couplets, only one gear 45 is shown in the vertical section through the transmission mechanism in Fig. 2. The gear 45 meshes with a gear 46 keyed to the intermediate or idler shaft 47 parallelly disposed to the shaft 41, and each of the other three gears on the primary shaft has a corresponding mating gear on the intermediate shaft 47, the latter being driven at any one of four speeds depending upon which one of the four pairs of gears are in mesh. The gear 46 fixed on the shaft 47 may be made to mesh with an axially slidable gear 48 splined to a secondary shaft 49 journalled in the column 20. Likewise, a second slidable gear (not shown) upon the shaft 49 may be made to mesh with a mating gear (not shown) upon the shaft 47. Thus the secondary shaft 49 may be driven in a well-known manner at any one of eight speeds depending upon the positioning of the several gear couplets.

The speed changing operation is effected by actuating a gear shifting mechanism 50 manually operable through a handle 51 positioned on the left side of the column, the transmission and shifting mechanism being similar in construction to the corresponding mechanisms disclosed in U. S. Patent No. 2,240,973, issued May 6, 1941, to Joseph B. Armitage. A range change gear couplet 52 is slidably splined on the forward end of the secondary shaft 49. The couplet 52 includes a low speed gear 53 and a high speed gear 54. When the gear 53 meshes with a large gear 55 fixedly splined on the spindle shaft 25, the tool spindle is operated in the slow speed range and when the gear 54 meshes with a small gear 56 likewise splined to the spindle shaft 25, the spindle is operated in the high speed range. The position of the range change gear couplet 52 is controlled by manipulation of a control handle 57 operably mounted on the left side of the column 20.

Figure 3:
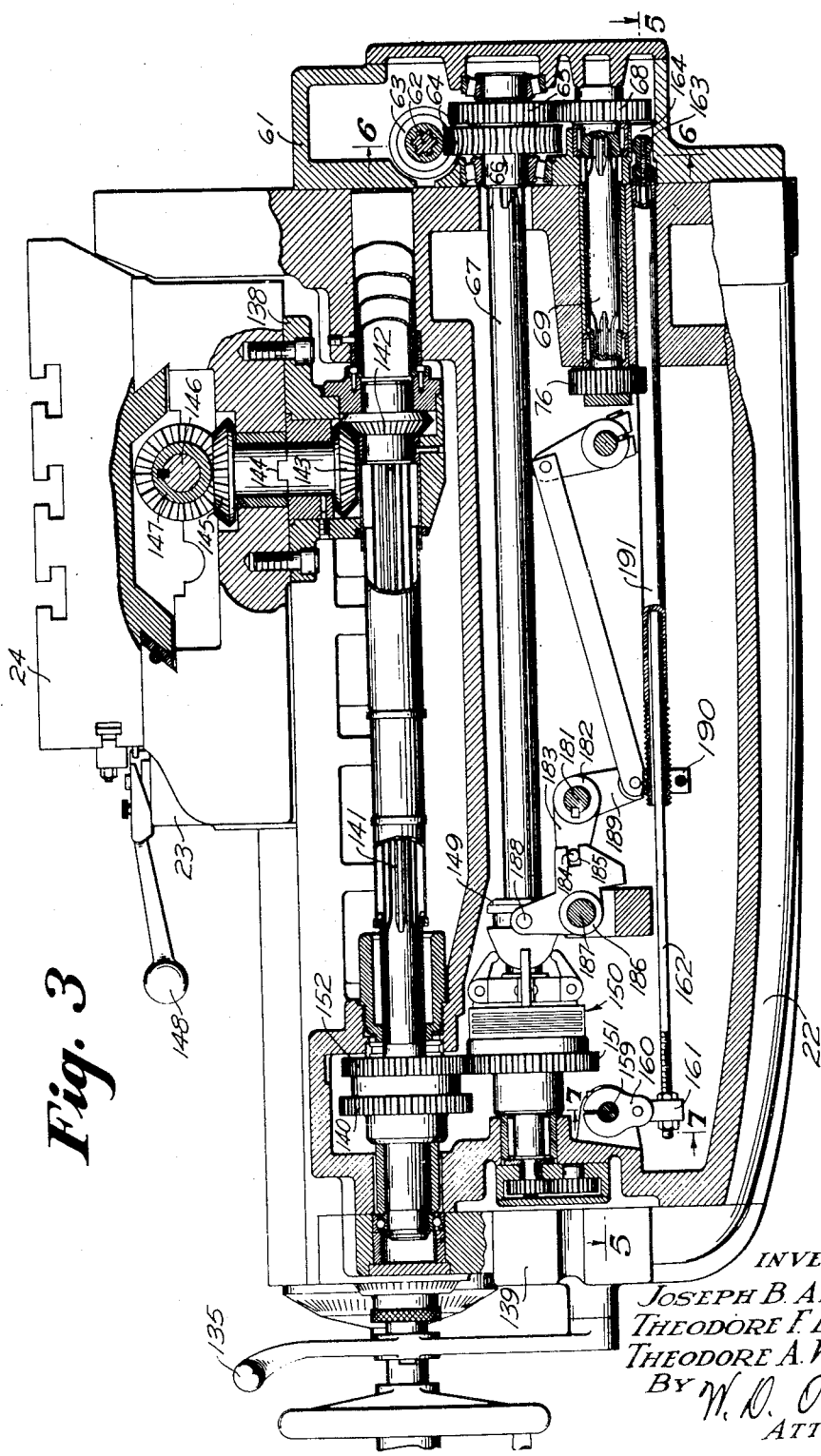
Fig. 3 is a view partly in right side elevation and partly in vertical longitudinal section through the knee of the same machine, with parts broken away to show some of the work feeding mechanism.

The work supporting members of the milling machine, including the knee 22, the saddle 23 and the table 24, may be power driven individually or simultaneously from a separate power source constituted by a motor 60 operably mounted on the right side of the knee, as shown in Fig. 1, there being no driving connection between the spindle train and the work feeding mechanism. The motor 60 is bolted to a motor support bracket 61 which in turn is fastened to the knee 22. As shown in Figs. 3 and 6, the end of an armature shaft 62 extending from the motor 60 is splined to fit within an internally splined worm 63 journalled within the motor supporting bracket 61. Thus the motor 60 may be removed from the bracket for servicing or repairs without disturbing any part of the transmission mechanism. A worm wheel 64 rotatably journalled in the bracket 61 meshes with the worm 63. The worm wheel 64 and a spur gear 65 integrally formed therewith constitute a gear cluster 66 which is internally splined to receive the splined end of a rapid traverse power take-off shaft 67 extending longitudinally within the right side of the knee 22. The gear 65 meshes with a gear 68 journalled in the bracket 61 and internally splined to receive the splined end of a power take-off shaft 69 that is disposed parallel with the shaft 67 within the right side of the knee. The rapid traverse and power take-off shafts 67 and 69 are both driven at the same rate of speed by the motor 60 and constitute parts of a rapid traverse and power feed transmission 75 contained within the knee 22. As diagrammatically shown in Fig. 4, the power feed transmission 75 includes means to drive the table, saddle or knee at any one of thirty-two predetermined feed rates. The power take-off shaft 69 transmits power to this transmission by means of a spur gear 76 splined to the shaft 69 and meshing with a gear 77 keyed to a shaft 78. A second gear 79 keyed to the shaft 78 meshes with a gear 80 fixedly keyed to a primary transmission shaft 81.

A pair of gear clusters 82 and 83 are slidably splined on the shaft 81 for continuous rotation therewith. The cluster 82 includes a pair of gears 84 and 85 and the cluster 83 includes a pair of gears 86 and 87. Each of the four gears has a mating gear keyed to an intermediate or idler shaft 88. Thus the gear 84 will mesh with a gear 89 while the gear 85 will mesh with a gear 90. Likewise, the gear 86 will mesh with a gear 91 and the gear 87 will mesh with a gear 92. Gear shifting mechanism (not shown) is arranged to be operated by means of a handle 93 on the front of the knee, as shown in Fig. 1, which serves to effect axial movement of one or the other of the two gear clusters 82 or 83 to a position wherein the required gear is in mesh with its mating gear on the idler shaft 88. Thus the shaft 88 may be driven at any one of four speeds depending upon which of the four pairs of gears are in mesh.

Four gears 94, 95, 96 and 97, comprising two gear couplets, are axially slidable on a splined secondary transmission shaft 98 disposed parallel with the idler shaft 88. The gear 94 may be positioned to mesh with a gear 99 or the gear 95 may be positioned to mesh with the gear 90 on the shaft 88. Likewise, the gear 96 of the second gear cluster may be positioned to mesh with a gear 100 or the gear 97 thereon may be positioned to mesh with a gear 101. Thus the secondary transmission shaft 98 may be driven at any one of sixteen predetermined speeds. A comparatively wide faced gear 105 keyed to the secondary shaft 98 meshes with a spur gear 106 keyed on a back-gear shaft 107. When a gear cluster 108 mounted for free rotation on the secondary transmission shaft 98 is positioned to permit a gear 109 integrally formed therewith to mesh with a gear 110 keyed to the back-gear shaft 107, a wide faced gear 111 also meshing with the gear 109 will be driven in the slow speed range. However, when an internal gear 112 in the gear cluster 108 is made to interlock with the end of gear 105, a direct drive from the shaft 98 will cause the gear 111 to be driven in the high speed range.

A feed safety slip clutch 115 mounted on a shaft 116 in conjunction with the gear 111 operates in a well-known manner to provide means for preventing damage to the transmission 75 or to the motor 60 upon the occurrence of an overload. A gear 117 keyed to the shaft 116 meshes with a gear 118 keyed to a shaft 119. The gear 118 meshes with a gear 120 rotatably mounted on a crossfeed screw shaft 121 and the gear 120, in turn, meshes with a gear 122 rotatably mounted on an elevating shaft 123. Another gear 124 keyed to the shaft 119 serves to drive a gear 125 rotatably mounted on the elevating shaft 123 which in turn meshes with and turns a gear 126 rotatably mounted on the crossfeed screw shaft 121, the direction of rotation being opposite that of gears 122 and 120, respectively.

In order to utilize power for effecting an upward movement of the knee, a shifting handle 127 (see Fig. 1) is moved to a right hand position from the neutral position there shown. This will cause a clutch collar 128 splined to the elevating shaft 123 to be shifted so as to bring the clutch teeth thereon into engagement with corresponding teeth on the hub of the gear 122. Thus the direction of rotation of the gear 122 will be imparted to the shaft 123, and through a pair of bevel gears 129, to an elevating screw 130 rotatably supported in the bottom of the knee 22, thereby effecting an upward movement of the knee at a predetermined feed rate. If the shifter handle 127 is moved to the left hand position, the clutch collar 128 will be moved forwardly to engage the clutch teeth thereon with those on the hub of the gear 125. Thus the clockwise rotation of the gear 125 will cause the shaft 123 to rotate in the same direction and effect rotation of the elevating screw 130 in a manner to lower the knee. A slip clutch 131 appropriately disposed on the shaft 123 serves to prevent any damage to the drive mechanism if an excessive load is placed on the knee.

A crossfeed movement of the saddle 23 may be effected by mechanism controlled by a crossfeed shifter handle 135 mounted on the front of the knee 22. If the handle is shifted to the right, from the neutral position shown in Fig. 1, a clutch collar 136 slidably splined on the crossfeed screw shaft 121 is moved backwardly until the clutch teeth thereon lock with corresponding clutch teeth on the hub of the gear 120. Thus the clockwise rotation of the gear 120 will be imparted to the shaft 121. Since a nut 137 threaded on the screw shaft 121 is fixed in a bracket 138 attached to the saddle 23, the saddle will move inwardly toward the face of the column 20.

If the crossfeed shifter handle 135 is moved to its left position, the clutch collar 136 will be moved forwardly until the clutch teeth thereon engage with corresponding teeth on the hub of the gear 126. Thus the counterclockwise rotation of the gear 126 will be imparted to the crossfeed screw shaft 121 and the saddle 23 will be moved along the top surface of the knee 22 away from the face of the column. In order to facilitate the assembly, servicing or repair of the feed transmission, the entire transmission mechanism 75 including the gear 80 and the primary shaft 81 is carried by and is unitarily removable with a distribution box 139 which is fastened to and constitutes the entire front face of the knee 22.

Power for effecting the longitudinal movement of the table 24 at feed rate is also obtained through the transmission 75. A gear 140 mounted on a splined shaft 141 is rotatably driven from the gear 120. The splined shaft 141 extends rearwardly and longitudinally along the upper right side of the knee and is rotatably supported within the bracket 138 mounted on the bottom side of the saddle 23. A bevel gear 142 is rotatably carried within the bracket 138 in axial alignment with the shaft 141 and has splined connection therewith in such manner that power is imparted to the gear 142 in any position of the saddle 23.

The bevel gear 142 meshes with a complementary bevel gear 143 rotatably retained in the bracket 138 as shown in Fig. 3. Clutch teeth 144 on the extending end of the hub of the gear 143 interlock with corresponding teeth on the downwardly extending hub of a bevel gear 145 rotatably retained within the saddle 23. The bevel gear 145 meshes with two corresponding reversing gears rotatably mounted on a table screw shaft 146, in a manner well known in milling machine construction, with an axially shiftable clutch collar 147 keyed to the screw shaft 146 intermediate the gears. By manipulating a table control handle 148 shown in Fig. 1, the clutch collar 147 may be brought into engagement with the one or the other of the two reversing gears on the table screw shaft to effect longitudinal movement of the table to the right or to the left, as desired.

Figure 4:
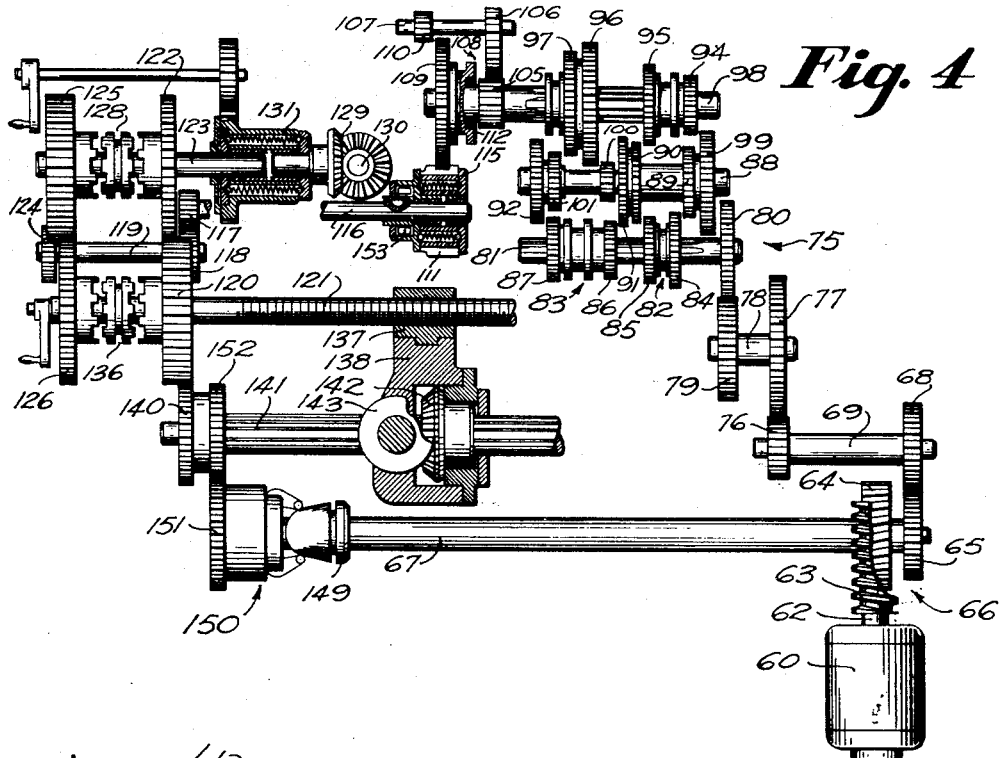
Fig. 4 is a diagrammatic, expanded view showing schematically the transmission mechanism within the knee for effecting feeding movements of the machine.

As previously indicated, the table, saddle and knee may also be operated at rapid traverse rate by means of the feed motor 60, the power being transmitted from the motor shaft 62 through the worm 63 and worm wheel 64 to the rapid traverse shaft 67 horizontally disposed within the right side of the knee 22, as shown in Figs. 3 and 4. A clutch collar 149 on the shaft 67 may be moved axially to effect the engagement of a rapid traverse clutch 150 in a manner to transmit the rotative power from the shaft 67 to a gear 151. The gear 151 meshes with a gear 152 formed integrally with the gear 140 keyed to the splined shaft 141. Since the gear 140 meshes with the gear 120, power required for operating the table, saddle or knee at rapid traverse rate is furnished to the respective feed drives of these three units in the manner previously described.

Figure 10:
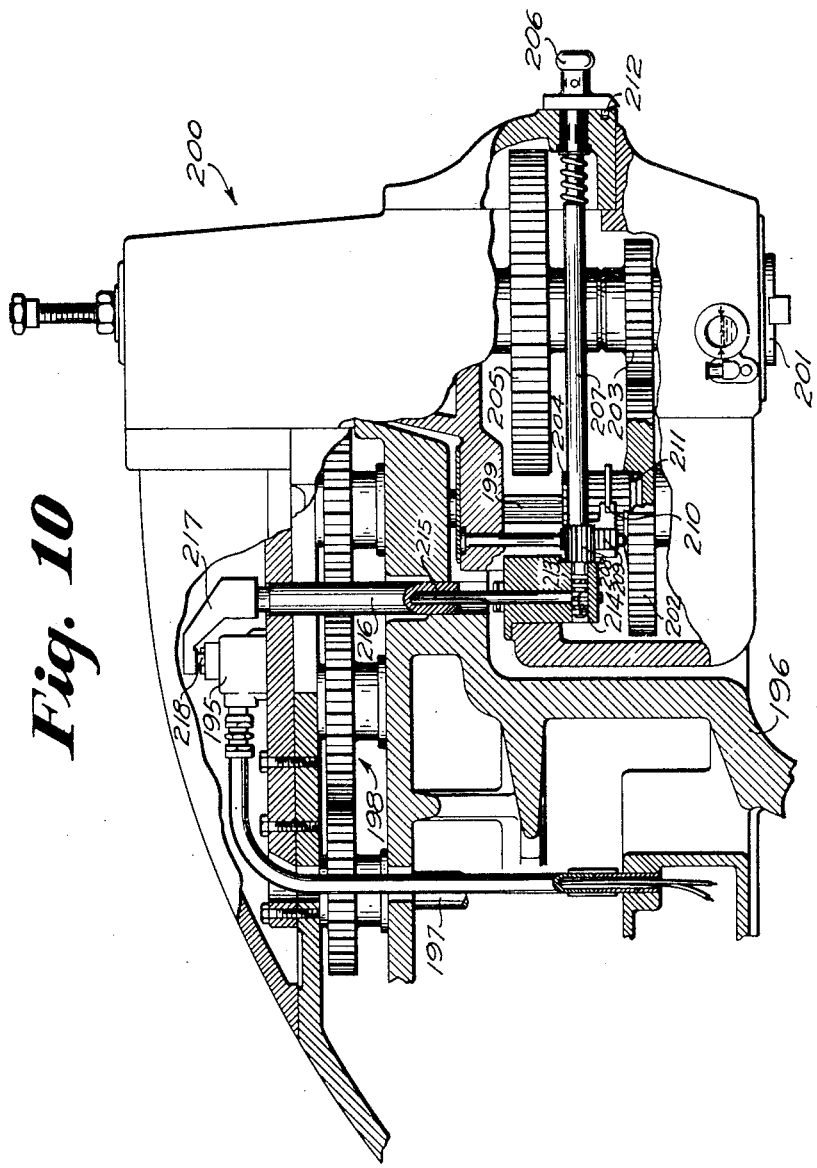
Fig. 10 is a view partly in left side elevation and partly in vertical section of the upper part of a milling machine of the vertical spindle type embodying a modification of one feature of the invention.

An overrunning clutch 153 interposed between the gear 111 and the shaft 116 prevents interference by the power feed transmission 75 with operation at rapid traverse rate. Thus when both are operated simultaneously, the work supporting elements will be operated at rapid traverse rate by reason of the shaft 116 overrunning the feed transmission mechanism. In a vertical type milling machine, such as is illustrated in Fig. 10, in which the spindle head is vertically movable in relation to the column, power for effecting rapid traverse and vertical feeding movements of the head is transmitted from the knee 22 through a gear train (not shown) connected with a rearward extension of the shaft 141.

The spindle motor 30 and the feed motor 60 are electrically controllable from various conveniently disposed stations on the machine. The main control station is located above the gear shifting mechanism 50 on the left side of the column 20. Electrical control means at this station include a starting push button switch 155, a combined stop and brake push button switch 156 and an inching push button switch 157, as shown in Fig. 2. When the starting button 155 is depressed, the motors 30 and 60 are started simultaneously to provide power for the spindle and work supporting mechanisms. A partial depression of the stop button 156 will effect deenergization of the two motors while a full depression thereof will effect an electrical plugging or braking of the spindle motor 30 which will consequently exert a retarding action upon the spindle 25.

The actuation of the inching button 157 will cause a single momentary energization of the spindle motor 30 to provide a jogging action as an aid in the meshing of the gear teeth during a gear shifting operation. The control switch associated with the inching button 157, or a similar switch connected in parallel therewith may be connected with the handle 51 of the gear shifting mechanism 50 and arranged in a manner to be actuated by the withdrawal of the plunger prior to the manipulation of the handle in effecting a gear shifting movement, as indicated by a switch 154 shown in Fig. 2.

A second control station is located at the right front corner of the knee. A starting lever 158, as shown in Fig. 1, is serratedly mounted on the extending end of a starting lever shaft 159 journalled within the knee 22. As shown in Figs. 3, 5 and 7, a member 160 of a linkage assembly is fixedly mounted on the inner serrated end of the shaft 159. A second member 161 of the linkage assembly is pivotally pinned to the member 160 and adjustably bolted to the forward end of a starting lever rod 162. This rod extends rearwardly and longitudinally within the lower right side of the knee 22 into the motor supporting bracket 61. A cam element 163 threadably attached to the rearward end of the rod 162 is slidably retained for axial movement with the rod in a circular recess 164 in the bracket 61 (see Figs. 3 and 5).

A series of three micro-switches 165, 166 and 167 are retained in a switch compartment 168 within the bracket 61 directly beneath the feed motor 60, as shown in Figs. 5 and 6. Each of the three micro-switches is provided with an actuating button 169. A push rod 170 associated with the normally open micro-switch 165 and arranged to abut the actuating button thereof, is slidably and horizontally disposed within a bore in the bracket 61 at right angles to the circular recess 164. Likewise, a pair of push rods 171 and 172 are disposed in abutting axial alignment with the actuating buttons of the micro-switches 166 and 167, respectively, and are retained for axial movement within similar bores in the bracket 61.

Each of the three push rods 170, 171 and 172 is resiliently retained in a position wherein the rounded end thereof extends slightly into the circular recess 164, each push rod being encircled for this purpose by a spring 173 retained on an undercut portion of the rod, one end of the spring abutting against the rod, while the other end abuts against a spring retaining plate 174. Thus each of the three push rods is constantly urged to the left, the maximum movement in this direction being limited by the abutment of a limiting flange 175, integrally formed with each push rod, against the plate 174.

In order to start the spindle and feed motors 30 and 60 from this second control station at the right front corner of the knee 22, the starting lever 158 is moved downwardly to effect a rearward axial movement of the rod 162 and consequently cause the depression of the push rod 170 through engagement by the cam 163. Since the contacts within the micro-switch 165 operatively associated with the rod 170 are normally open, the depression of the push rod 170 will close the contacts in the switch. Upon the manual release of the starting lever 158, the linkage mechanism associated therewith will automatically return it to a neutral position. This is effected through a detent mechanism including an element 176 fixedly attached for rotation with the shaft 159 (see Figs. 7 and 8). A detent notch or groove 177 in the element 176 is engaged by a detent plunger 178 resiliently supported and slidably retained for axial movement in the bottom of the knee 22. Since the movement of the lever 158 is never sufficient to move the detent notch 177 on the element 176 out of engagement with the plunger 178, the resilient force applied to the plunger will normally urge the shaft 159 and the handle 158 to neutral position.

In order to stop the spindle and feed motors 30 and 60, the starting lever 158 is moved upwardly, thereby rotating the shaft 159 in a clockwise direction and moving the rod 162 and cam 163 axially into engagement with the push rod 171 operatively associated with the micro-switch 166. This switch contains a double set of contacts, and a partial depression of the rod 171 will cause one set of normally closed contacts to open. Continued upward movement of the starting lever 158 will cause a second set of normally open contacts within the switch 166 to close. The opening of the first set of contacts will cause the electrical control circuit of the spindle and feed motors to be broken while the closure of the second set of contacts will effect the electrical braking of the spindle motor.

As previously mentioned, power for the rapid traverse drive is supplied by the feed motor 60 and an arrangement is provided for energizing the motor upon upward manipulation of a rapid traverse handle 180 to engage the clutch 150. The handle is clamped on the end of a shaft 181 extending from the right side of the knee 22. A linkage member 182 fixedly retained on the shaft 181 within the knee has a forwardly extending arm 183 integrally formed therewith, as shown in Figs. 3, 5 and 9. A horizontally disposed pin 184 embedded in the end of the arm 183 is adapted to operate longitudinally in a slot 185 disposed in the rearward extension of a linkage member 186. The member 186 is retained on a horizontally disposed shaft 187 journalled within the knee 22. A pin 188 embeddedly retained in the end of an upright extension of the member 186 is fitted into the groove in the clutch collar 149. Thus when the rapid traverse handle 180 is raised, movement of the linkage will result in a forward axial movement of the clutch collar 149 to cause the engagement of the clutch 150 and thereby permit the transmission of power from the shaft 67 to the gear 151 in the rapid traverse transmission train, as previously described.

In conjunction with the aforedescribed control mechanism required to effect an engagement of the rapid traverse clutch, a linkage means is provided to close the micro-switch 167 in the electrical circuit and consequently energize the motor 60. To this end, the member 182 has a depending arm 189 to which a member 190 is rockably pinned (see Figs. 3 and 9). The member 190 is threadably adjusted on a rapid traverse sleeve 191 extending longitudinally within the lower right side of the knee 22 in concentric relationship with the rod 162, the latter being supported by the sleeve 191 and axially movable therein. As shown in Fig. 5, the push rod 172 is in engagement with the high point of a cam surface 192 integrally formed on the rearward end of the rapid traverse sleeve 191.

The micro-switch 167 operatively associated with the rod 172 is of a normally closed type but since the cam 192 on the sleeve 191 is normally positioned to depress the rod 172, the contacts within the micro-switch will ordinarily be retained in an open position. However, when the rapid traverse lever 180 is raised to effect a rapid traverse movement of one of the work carrying members, the linkage means associated therewith will effect a forward axial movement of the sleeve 191 and cause the resiliently urged push rod 172 to engage the smaller portion of the cam surface 192 and permit the contacts within the micro-switch to assume their normally closed position. By action of this switch, the feed motor 60 is energized to supply power to the rapid traverse drive.

In a milling machine of the type having a vertically disposed spindle such as is shown in Fig. 10, a separate inching switch 195 is provided for automatic actuation upon the shifting of the range change gears within the spindle head. As here shown, power for driving the spindle is transmitted into the upper portion of a column 196 by a vertically disposed shaft 197 connected at its lower end by bevel gearing (not shown) to speed changing transmission mechanism of the type shown in Fig. 2 located in the mid-section of the column. A gear train 198 serves to transmit the power from the shaft 197 to a vertically disposed spline shaft 199. A head 200 slidably mounted for vertical movement on the upper front face of the column 196 rotatably supports a vertically disposed tool spindle 201 in a manner well known in machine tool construction. A large gear 202 rotatably mounted on the lower end of the shaft 199 meshes with a small gear 203 keyed to the spindle for driving the latter in the high speed range. Rotation of the spindle in the slow speed range is effected through a small gear 204 slidably mounted on the splined portion of the shaft 199 and adapted to mesh with a large gear 205 keyed to the spindle 201. The gear 204 may be shifted along the shaft 199 by means of a shifter handle 206 mounted on the front of the vertical head 200. The handle is fixed on the extending end of a shifter shaft 207 horizontally disposed within the head and provided adjacent its inner end with a relatively wide faced gear 208. The gear 208 meshes with a vertically disposed, slidably mounted gear rack 209, to which is attached a shifter fork 210 that serves to move the gear 204 selectively to engage the desired speed range.

In order to position the gear 204 to effect rotation of the spindle 201 in the high speed range, the handle 206 is pulled outwardly and turned clockwise. The corresponding clockwise rotation of the gear 208 will cause the rack 209 to move downwardly and consequently effect a like downward sliding movement of the gear 204 until the teeth thereon mesh with corresponding internal gear teeth 211 integrally formed within the gear 202 thereby clutching it to the shaft 199. To shift the gear 204 into mesh with the gear 205, the handle 206 is pulled outwardly and turned in a counterclockwise direction Thus the gear 208 will drive the rack 209 and shifting fork 210 upwardly until the gear 204 carried by the fork is brought into mesh with the gear 205 for effecting rotation of the spindle 201 in the slow speed range.

For maintaining the shiftable gear 204 in either position, the shifting handle 206 is provided with an inwardly extending pin 212 which is arranged to selectively engage either of a pair of complementary locking holes formed in the face of the head 200 corresponding with the two gear positions. In effecting a shifting operation, the handle 206 is first drawn outwardly a sufficient distance to disengage the pin 212 from the locking hole in which it is lodged. A slightly further outward movement of the handle 206 results in closing the inching switch 195 which is connected in parallel with the inching switch 157 on the side of the column and operates to facilitate shifting of the range change gearing by momentarily energizing the spindle motor 30, as previously explained, to effect momentary rotation or jogging of the spindle gear train to facilitate proper meshing engagement of the gears.

When the handle 206 is drawn out beyond the unlatching position, a circular rack 213 on the inner end of the shaft 207 operates to turn a meshing pinion 214 secured to a vertically disposed control shaft 215. As shown, the shaft 215 is rotatably mounted in an underlying part of the vertically movable head 200 and is splined to cooperate with an internally splined hollow shaft 216 that is rotatably journalled in concentric relationship within the column 196. The hollow shaft 216 is provided at its upper end with a cam member 217, the actuating face of which engages an operating button 218 of the inching switch 195, the shape of the actuating cam face being such that the button 218 is depressed and the switch 195 is closed when the handle 206 is drawn outwardly a slight distance past the unlatching position.

Electrical energy for operating the spindle motor 30, the feed motor 60 and the various control relays, and other apparatus is derived from line conductors L1, L2 and L3 as indicated in the circuit diagram shown in Fig. 11, the line conductors being connected to a source of power by means of a disconnecting switch 220 in the usual manner. In order to operate any of the motors or control elements it is necessary to energize a control circuit that is represented in light lines in the drawings. Power for the control circuit is obtained from a transformer 221 having a primary winding 222 one terminal of which is connected to the line conductor L3, one of the other line conductors, in this instance the conductor L1, being connected to one or another of a series of taps on the primary winding depending upon the voltage of the supply current. A secondary winding 223 of the transformer 221 is arranged to provide energy at the desired voltage for the control circuit. A pair of fuses 224 connected to the respective terminals of the secondary winding 223 of the transformer afford protection to the apparatus in the event of a short circuit or other overload condition.

Energization of the control circuit may be effected by depressing a normally open master switch start button 225 constituting part of a master control station. With the master start button switch 225 closed, control current will flow from one terminal of the transformer secondary 223 through the associated fuse 224 into a conductor 226 and thence through a normally closed master stop button switch 227 and the closed master start button switch 225 to a conductor 228. The conductor 228 is connected to an actuating solenoid coil 229 of a master control relay 230, the circuit being completed through a return conductor 231 that is connected to the other fuse 224 associated with the other terminal of the secondary winding 223 of the transformer 221.

Energization of the solenoid coil 229 in this manner causes the master control relay 230 to move to a closed position, thereby closing two sets of contacts. A holding circuit for maintaining the relay closed when the master start button 225 is released, is established through a shunting conductor 232 which leads from a connection between the master push button switches 225 and 227 and is connected by one set of contacts and a contact bar 233 in the relay 230 to a conductor 234 leading to the conductor 228. This holding circuit will maintain the master relay 230 in closed position, even though the starting button 225 is released, until such time as the circuit is broken by depressing the master stop switch button 227, whereupon the relay 230 will drop to an open position.

With the master relay 230 closed, a control circuit for starting the spindle motor and the feed motor is established from the energized conductor 228 through a conductor 235 which leads to the normally closed micro-switch 166 that may be mechanically operated by actuation of the starting lever 158 on the knee of the machine, as shown in Figs. 1 and 5. When the starting lever 158 is in a neutral or in a starting position, the actuating button extending from the switch 166 is engaged by the reduced portion of the cam 163, as shown. Thus a contact member 236 within the micro-switch is normally retained in closed engagement with a stop contact 237. This contact is connected to a pair of directional spindle control switches 238 and 239 by a conductor 240. The combined positioning of the two directional switches 238 and 239 serves to determine the direction of rotation of the spindle motor 30 and consequently of the spindle 25.

When the two switches are positioned to effect a forward or clockwise rotation of the spindle motor 30, the contact plates of the respective switches may be assumed to be in the position indicated by full lines in Fig. 11. To effect a reverse or counterclockwise rotation of the spindle motor, the contact plates within the directional switches are positioned as indicated by the dotted lines in Fig. 11. These two contact plates are moved simultaneously to either of these positions through leverage mechanism connected with an operating handle 241.

With the switches in the forward position, as shown, current from the conductor 240 can flow only through the contact plate of the forward directional switch 238 to a common conductor 242 connecting with one terminal of the stop push button switch 156 located at the control station on the left side of the column 50, as previously described. Since the switch 156 is normally closed, the power for the control circuit is free to flow through the switch 156 and a conductor 243 to one terminal of the starting push button switch 155 located at the same control station. If the switch 155 is manipulated to a closed position, the power will then flow through this switch to a conductor 244 connecting with a solenoidal coil 245 associated with a feed motor control relay 246.

The coil 245 may also be energized through the manipulation of the starting lever 158 at the control station on the knee 22. A downward movement of the lever 158 will cause the actuating button of the micro-switch 165 to be engaged by the enlarged portion of the cam 163. Since the power supplied to the push button starting switch 155 is also supplied to one terminal of the micro-switch 165 through a conductor 250, movement of a contact plate 251 within the micro-switch to closed position by the actuating button will permit the current to pass through the switch to a conductor 252. The current will then flow from the conductor 252 to the conductor 244 and thence to the solenoidal coil 245 of the feed motor relay 246.

The solenoidal coil 245 is connected by a return conductor 253 to a contact plate 254 of an instantaneous relay 255 associated with the spindle motor. Since the plate 254 of the relay 255 is normally retained in a closed position, the current will flow from the coil 245 through the conductor 253 and the plate 254 to a conductor 256. The conductor 256 is connected to one of a pair of terminals engaged by a contact element 257 in the master control relay 230. The other contact associated with this element is connected to the return line 231 to complete the circuit.

The energization of the coil 245 will cause the actuating rod supporting the various contact plates within the feed motor control relay 246 to move to a closed position. A holding circuit for the relay is thus established, in that the current will then flow in shunt relationship with the push button starting switch 155 through the conductor 250 and a conductor 258 to one of a pair of terminals associated with a contact plate 259 of the relay 246. With the contact plate in a closed position across the terminals, the control current will flow through the plate and a conductor 260 connecting with the conductor 244 and the coil 245. Thus the coil will remain energized and the feed motor control relay will be retained in closed position until such time as the holding circuit is broken.

Upon the energization of the coil 245 to effect closure of the relay 246, current will flow through the energized conductors 250 and 258 to one of a pair of terminals associated with a contact element 261 in the relay 246 and thence through the element 261 and a conductor 262 to a solenoidal actuating coil 263 associated with a spindle motor control relay 264. The coil 263 is connected to a line 265 which in turn connects with the conductor 256 returning to the master control relay 230. Since this relay has already been energized to a closed position, the current will flow from the conductor 256 through the contact plate 257 and the return conductor 231 to the secondary winding 223 of the transformer 221 to complete the circuit.

The closing of the spindle motor relay 264 will establish a holding circuit in that the power can then flow from the conductors 250 and 258 to one of a pair of terminals associated with a contact plate 266 in the relay. The other terminal associated with the plate 266 is connected to the line 262 which is connected with the coil 263. Thus the spindle relay will remain closed until the holding circuit is broken.

Closing of the spindle control relay 264 serves to effect connection of the spindle motor 30 with the main lines L1, L2 and L3. With the relay closed, control current will flow from the one terminal of the secondary winding 223 of the transformer 221 through the fuse 224, the conductor 226, the master stop button switch 227, the conductor 232, the contact plate 233 in the master control relay 230, the conductor 234 and the conductor 228 connecting with one of a pair of terminals associated with a contact plate 267 of the relay 264. Since the spindle control relay 264 has already been actuated to closed position, the current will flow through the plate 267 to a conductor 268. This conductor connects with one terminal on each of the spindle directional switches 238 and 239.

With the spindle directional switches positioned for forward rotation of the spindle 25, the control current will flow from the conductor 268 through the switch 239 to a conductor 269 connecting with an actuating coil 270 in a "forward" spindle motor switch 271. The circuit from the coil 270 permits a current flow therefrom through a conductor 272 connecting with one of a pair of terminals associated with the contact plate 273 in a "reverse" spindle motor switch 274. The other terminal is connected to the conductor 256 which carries the current to the master control relay contact plate 257 and on through the return line 231 to the transformer 221 to complete the circuit.

The circuit from the actuating coil 270 in the "forward" switch 271 extends through the contact plate 273 in the "reverse" switch 274 as a safety measure. Even though a mechanical linkage means is provided to interconnect the spindle motor switches 271 and 274 and prevent the closure of one of the said switches when the other is already closed, the electrical safety interlock through the contact plate 273 is also provided. Therefore, if the "reverse" switch 274 were already closed to energize the spindle motor 30 for reverse rotation, the contact plate 273 would have been raised out of engagement with the aforementioned contacts and it would be impossible to close the "forward" motor switch 271 since the circuit through the actuating coil associated therewith could not be completed.

With the actuating coil 270 of the forward spindle motor switch 271 energized, the switch is moved to closed position thereby connecting the motor directly to the main lines L1, L2 and L3 and causing it to operate in manner to effect a forward or clockwise rotation of the spindle 25.

Since the spindle motor 30 is used only to actuate the spindle, reversal in the direction of the rotation of the spindle is most conveniently effected by reversing the motor through selective action of the switches 271 and 274 and consequently there is no necessity for providing reverse gearing in the spindle transmission train.

To operate the spindle motor 30 in reversed or counterclockwise direction, the reversing handle 241 is actuated to re-position the contact bars of the directional switches 238 and 239 by moving them to the positions indicated by dotted lines in Fig. 11.

Since injury to the machine might result if a reversing action were effected inadvertently, particularly in the event that the cutter 27 was caused to rotate backwardly while engaged with a work piece, a safety feature is incorporated whereby both the spindle motor 30 and the feed motor 60 are automatically de-energized simultaneously upon movement of the reversing handle 241 in a reversing action.

As previously indicated, the holding circuit for the feed motor relay 246 extends from the energized control conductor 228, through a conductor 235, the normally closed stop switch 166 and the conductor 240 to the directional spindle control switches 238 and 239. The circuit then continues through whichever directional switch is closed, to the conductor 242 leading to the closed stop push button switch 156 and thence by the conductor 243, the conductor 250 and the conductor 258 to contacts bridged by the plate 259 of the feed motor relay from which a conductor 260 leads to the relay actuating coil 245.

When the switches 238 and 239 are moved simultaneously to effect reversal, they are both moved to open position at the same time and consequently the holding circuit to the coil 245 is broken and the feed motor relay 246 moves to open position thereby stopping the feed motor 60. This results in opening the holding circuit of the spindle motor relay 264 and it, in turn, moves to open position to de-energize the spindle motor control and to stop the spindle motor 30.

After the directional switches have been set in the reverse position, both motors will remain de-energized until started again as previously explained by closing either the starting push button switch 155 or the starting lever actuated switch 165 to energize the motor relay actuating coils. With the spindle reversing switches set in the reverse position, the control current for restarting the motors will flow from the transformer secondary 223 through the conductor 226, the master stop push button switch 227, the conductor 232, contact element 233 of the master control relay 230, the conductors 234, 228 and 235 to the stop switch 166 and thence by conductor 240 to the reverse or directional switch 239. With the switch 239 then closed in this circuit, the current flows through it and conductor 242 to the closed stop push button switch 156 and thence through the conductor 243 and either the starting push button switch 155 or the conductor 250, the starting lever switch 165 and the conductor 252 to the conductor 244 which is connected to the energizing coil 245 of the feed motor relay 246 causing it to close. Since the feed motor 60 operates in only one direction it then will resume its normal operation as previously described.

Control energy for the spindle motor switch is then made available through closing of the spindle motor relay 264 by energization from the feed motor relay as previously explained. From the closed spindle motor relay 264 the control current follows the conductor 268 to the spindle directional switches. Since only the reverse switch 238 is then closed, in this circuit, the current flows through it to a conductor 280 which is connected to energize an actuating coil 281 of the reverse spindle motor switch 274. The circuit is completed through a conductor 282, a contact bar 283 in the switch 271, the conductor 256, the closed contact element 257 in the master control relay 230 and the return line 231.

The contact element 283 in the forward spindle motor switch 271 serves as an electrical safety device, in that, when the switch is in closed position the circuit through the contact is open, thereby preventing the energization of the actuating coil 281 in the reverse switch 274. If the forward switch 271 were still in a closed position, the contact bar 283 would then be out of engagement with the contacts connected to the conductors 282 and 256. Thus it would be impossible to energize the coil 281 and close the reverse switch 274 with the "forward" switch 271 closed. The solenoidal action created by the energization of the actuating coil 281 serves to effect a closure of the contacts in the reverse spindle motor switch 274 and connects the spindle motor 30 directly to the main feed lines L1, L2 and L3. The spindle motor will then operate in counterclockwise direction and consequently the spindle 25 will likewise rotate in reverse direction.

The spindle motor 30 may be disconnected from the main supply lines L1, L2 and L3 to de-energize it at any time merely by depressing the button on the stop switch 156 or by moving the lever 158 to the stop position. In the latter case, the movement of the lever 158 will so actuate the cam 163 on the end of the starting lever rod 162 as to move the contact plate 236 away from the terminal 237 in the micro-switch 166. Thus the current supply from the secondary winding in the transformer 221 is interrupted at the switch 166. The manipulation of the stop push button switch 156 will cause a like interruption in the supply of current from the transformer. Simultaneously, with the breaking of this circuit, the feed motor relay 246 and the spindle motor relay 264 will drop out to open position since their respective holding circuits are thereby broken. Since both the feed motor relay and the spindle motor relay are moved to open position, both the feed motor and the spindle motor will be de-energized substantially simultaneously. Restarting of both motors may be effected as previously described by closing the starting push button switch 155 or the lever actuated starting switch 165.

If after the spindle motor 30 has been deenergized by actuation of the push button stop switch 156 or the lever 158, it is desired to retard the rotation of the spindle 25, an electrical braking action may be effected by a farther movement of either the push button or the lever. The braking action is purely electrical, and, as shown in Fig. 11, effects a reversing or plugging action upon the spindle motor 30. Consequently there is no necessity for providing mechanical braking means to check the spindle speed.

When the stop push button 156, for example, is fully depressed, its contact element completes a circuit through the energized conductors 228 and 235 to a conductor 284 which connects with a movable contact element 285 in a plugging switch 286 associated with the spindle motor 30. Likewise, a farther upward movement of the lever 158 will cause the switch 166 to move to a position in which the contact plate 236 will engage a brake contact 287 thereby effecting a connection from the conductor 235 to the conductor 284. As indicated in the drawing, both of the switches 156 and 166 are so arranged that the braking action may be effected immediately following de-energization of the spindle motor simply through a slightly farther movement of the switch elements.

The movable plugging switch contact 285 is actuated by the shaft of the spindle motor 30 in such manner that rotation of the shaft will bring it into engagement with the one or the other of a pair of cooperating stationary contact elements 288 and 289, depending upon the direction of rotation. For the purposes of the present explanation it will be assumed that when the motor is rotating in the forward or clockwise direction the movable contact 285 will engage the stationary contact 288 and when the motor is rotating in the reverse or counterclockwise direction the contact 285 will be shifted into engagement with the contact 289.

As shown in the drawing, the forward stationary contact 288 is connected to the conductor 280 which leads to the actuating coil of the reverse spindle motor switch 274 while the reverse stationary contact 289 is connected to the conductor 269 leading to the actuating coil of the forward spindle motor switch 271.

If it is assumed that the spindle motor 30 is operating in forward direction when either of the stop switches 156 or 166 is moved to open position and then to brake position, the feed and spindle motor relays are immediately opened as previously explained thereby de-energizing the spindle motor control circuit and permitting the forward spindle motor switch 271 to drop to open position. The movable contact 285 of the plugging switch will then be in engagement with the forward stationary contact 288 and when the conductor 284 is energized through one or the other of the closed braking switches, the current will flow through the contacts 285 and 288 to the conductor 280 and thence to the actuating coil 281 of the reverse spindle motor switch 274. Since the forward spindle motor switch 271 has already opened, the circuit will be completed through the conductor 282, the contact element 283 of the forward switch to the return conductor 256 which connects through the contact plate 257 of the master relay 230 with the return line 231.

Energization of the coil 281 results in closing the reverse spindle motor switch 274 and in effecting energization of the spindle motor in manner to set up a torque tending to rotate it in the reverse or counterclockwise direction, thereby effecting a plugging action to brake the motor and quickly reduce the speed of the spindle 25. If the brake switch is held closed, the spindle will be stopped almost immediately, although if desired the braking action may be discontinued at any time by releasing the braking switch. Just prior to the time at which the motor 30 stops rotating in the forward direction, the movable contact 285 of the plugging switch 286 is returned through resilient action to its neutral position out of engagement with the contact 288, thereby de-energizing the plugging control circuit and permitting the reverse spindle motor switch 274 to open in order to avoid acceleration of the motor 30 in the reverse direction.

If it is assumed that the spindle motor is operating in the reverse direction when one of the stop switches is moved to braking position, the reverse spindle motor switch 274 will be opened and since the plugging switch contact 285 is then in engagement with the reverse stationary contact 289, the plugging control circuit will be completed from the energized conductor 284 to the conductor 269 leading to the actuating coil 270 of the forward spindle motor switch 271, the circuit being completed through the closed contact element 273 of the reverse switch 274. The forward spindle motor switch 271 will then close to energize the spindle motor 30 in a manner to exert torque for forward rotation, thereby effecting a plugging action to stop the motor as previously explained, the movable plugging switch contact being returned to neutral position to discontinue the plugging action before forward rotation occurs.

In order to avoid the possibility of the spindle motor being energized inadvertently through action of the plugging switch if the motor should be turned manually, thereby effecting engagement between the contact 285 and one of the stationary contacts, the plugging circuit is so arranged that the plugging switch is inoperative unless one or the other of the spindle motor switches 271 and 274 is in closed position. This is accomplished through auxiliary contacts in each of the spindle motor switches that are arranged to be bridged by the contact element 273 or 283 when the respective switch is closed.

Electric energy is made available through the closed contact element 233 in the master control relay 230 and the conductors 234 and 228 connecting with one of each of said pairs of auxiliary contacts in the spindle motor switches. Thus when the forward motor switch 271 is closed to effect a clockwise rotation of the motor 30, the contact element 283 associated therewith will be moved upwardly into engagement with a pair of these auxiliary contacts in order to permit a current flow from the conductor 228 to a conductor 290 connecting with an actuating coil 291 in the plugging switch.

A safety latch 293 actuated by the energization of the coil 291 serves to release the movable contact 285 for movement whenever one or the other of the spindle motor switches is in closed position. The circuit from the coil 291 is completed through a conductor 292 connecting with conductors 265 and 256. Likewise, when the reverse spindle motor switch 274 is closed to energize the motor for counterclockwise rotation, the contact element 273 therein will be raised into engagement with a pair of the auxiliary contacts which will permit a current flow from the conductor 228 to the conductor 290 and the coil 291 in the plugging switch.

Since the time interval during which one spindle motor switch is opened to de-energize the spindle motor and the opposite spindle motor switch is closed to apply electrical braking is extremely brief before any appreciable reduction in motor speed has occurred, the opposite spindle motor switch will have been closed to continue the energization of the coil 291 in the plugging switch. When the speed of the spindle motor 30 has been reduced sufficiently to permit the movable contact 285 to return to neutral position, the braking spindle motor switch will be opened and the contact 285 will be retained in neutral position by the action of the safety latch 293. The safety latch will not function to release the movable contact 285 until such time as one of the spindle motor switches 271 or 274 is closed to effect energization of the coil 291 in the plugging switch 286. Thus it is not possible to effect energization of the spindle motor by manually rotating the spindle motor armature and causing the movable contact 285 to engage one of the two stationary contacts in the plugging switch.

Whenever either of the starting switches 155 or 165 is closed to start the spindle motor 30 in the one or the other direction, the feed motor 60 is started at the same time since it is necessary to close the feed motor control relay 246 in order to energize the spindle motor control relay 264. With the feed motor relay 246 closed, control current for starting the feed motor flows from the transformer 221 through the conductor 226, the master stop push button switch 227, the conductor 232, the contact plate 233 in the master control relay and conductors 234 and 228 to one of a pair of terminals associated with a contact plate 295 in the feed motor control relay 246. Since this relay is closed, the current will flow through the plate 295 to a conductor 296 connecting with an actuating coil 297 associated with a feed motor starting switch 298. The solenoidal action occurring upon the energization of the coil 297 will effect a closure of the feed motor switch 298 and connect the feed motor 60 to the main lines L1, L2 and L3.

The circuit from the actuating coil is completed in the following manner: A conductor 299 connected to the coil 297 is also connected with one of a pair of terminals associated with a normally closed contact element 300 in a feed motor overload relay 301. A conductor 302 connected to the other contact thereof is connected to a contact in a second feed motor overload relay 303. A normally closed contact plate 304 of the relay 303 permits current to flow through the relay to a conductor 305 which in turn is connected to one of the contacts in a spindle motor overload relay 306. A contact element 307 within the overload relay is normally retained in closed position to permit current to flow to a conductor 308 connecting with one of a pair of contacts associated with a contact bar 309 in another spindle motor overload relay 310. The second contact in the relay 310 is connected to the return conductor 256. Thus the current can flow through the conductor 256, the contact element 257 in the master control relay 230 and the return line 231 to the secondary winding 223 in the transformer 221.

The feed motor 60 may be de-energized simultaneously with the spindle motor 30 upon opening either one of the stop-brake switches 156 or 166 thereby interrupting the holding circuit for the feed motor control relay 246 and opening the circuit supplying the actuating coil 297 of the feed motor switch 298.

The spindle motor 30 is made to start substantially simultaneously with the feed motor 60 in order to obviate the possibility of feeding a work piece mounted on the table 24 into the cutter 27 when it is not rotating, as might happen if the feed motor 60 should be started separately. With the electrical circuit as previously described, the tool supporting spindle 25 must be rotating before the work piece on the table can be advanced in a feeding movement.

In order that the work supporting member may be moved at rapid traverse rate for setting up work when the spindle is not operating, a separate electrical control circuit is provided to energize the feed motor independently, for operation at rapid traverse rate. As previously mentioned, the rapid traverse switch 167 is actuated by an upward movement of the rapid traverse handle 180 on the right side of the knee 22, and it is constantly energized upon the closure of the master control relay 230. The normally closed microswitch 167 is generally retained in open position through the engagement of its actuating button with the enlarged portion of the rapid traverse cam 192 on the sleeve 191. However, when the handle 180 is raised, the resiliently retained actuating button of the switch will engage the reduced portion of the cam 192. The switch will then be closed to permit current to flow from the conductor 228 and the conductor 235 through a conductor 311 and the conductor 296 to the actuating coil 297 in the feed motor switch 298. Thus the switch 298 will be closed to effect energization of the feed motor 60. The circuit from the coil 297 is completed through the feed motor overload relays 301 and 303 and the spindle motor overload relays 306 and 310, as previously described. The feed motor will continue to be energized through this circuit only during the interval in which the rapid traverse microswitch 167 is closed through the manual retention of the handle 180 in the raised position. As soon as the handle is released, the switch 167 will be opened and the rapid traverse control circuit to the feed motor switch 298 opened to effect de-energization of the feed motor.

A coolant motor 314 is disposed to drive a coolant pump (not shown) mounted within the column 20 in a manner to supply a stream of coolant liquid to the cutter 27 through the usual piping and discharge nozzle (not shown). When it is desired to supply coolant only when the spindle 25 is rotating, an arrangement is provided whereby upon either of the starting switches 155 or 165 being manually actuated to effect a closure of the feed motor control relay 246, a control current supply is made available through the contact plate 259 constituting a part of the holding circuit for the relay 246. From the relay 246, the control circuit leads through conductors 260 and 244 to the blade of a selector switch 315 that, in the position shown, effects contact with the conductor 244 and connects it with a conductor 316 that leads to a coolant push button switch 317. This switch 317 may be manually manipulated to an open or closed position depending upon the necessity for the use of the coolant liquid during a particular machining operation. When the coolant liquid is desired, the switch 317 is closed to permit a flow of current through a conductor 318 to one of a pair of contacts associated with a normally closed contact plate 319 in a coolant motor overload relay 320. From the plate 319 the current will flow through a conductor 321 to an actuating coil 322 in a coolant motor switch 323 and thence through a conductor 324 to one of the contacts in another coolant motor overload relay 325. A normally closed contact bar 326 therein will permit current flow through a conductor 327, the conductor 256, the contact element 257 of the master control relay 230 and the return line 231 to the transformer 221 to complete the circuit.

The coolant motor switch 323 is closed upon the energization of the actuating coil 322, and the coolant motor 314 will then be connected to the main supply lines L1, L2 and L3 and will continue to be energized as long as the spindle motor 30 is energized. When either of the stop buttons 156 or 166 is operated to open position, the holding circuits for the control relays 246 and 264 are broken and the control current supply source to the coolant motor switch 323 is interrupted and consequently the coolant motor 314 will be de-energized.

If it is desired that the coolant motor 314 continue to operate regardless of whether or not the spindle motor 30 is energized, the selector switch 315 may be moved to its other position shown in dotted lines in Fig. 11. In this position the control current is derived directly from the conductor 228 leading from the master relay 230. Accordingly, with the selector switch 315 in the dotted line position and the switch 317 closed, the coolant motor 314 will continue to operate as long as the master relay 230 remains in closed position and regardless of whether or not any other motor is operating.

In order to facilitate the shifting of gears in the spindle transmission, a separate control means is provided in the electrical circuit to momentarily energize the spindle motor 30, as previously mentioned. The momentary energization of the spindle motor will effect a partial rotation of the gears in the spindle transmission thereby causing them to mesh more readily with their mating gears and will reduce the possibility of interference between or damage to the gears during the mechanical shifting operation. The normally open inching switch 157 is mounted on the left side of the column 20 and is readily accessible for manipulation during the manual rotation of the gear shifting handle 51 or the range change handle 57 to effect a desired setting of the gearing within the spindle transmission. The current supply for the inching switch is derived through the master control relay 230 from which it flows through the conductors 234, 228 and 235 to the switch 157. When the switch 157 is manually actuated to close the contacts therein, the current will flow through a conductor 330 connecting with a contact element 331 in a timing relay 332. The contact element normally engages a terminal contact to which a conductor 333 is attached. This conductor connects with the conductor 268 through which the current will flow to the two spindle direction switches 238 and 239. If we assume that the directional switches are set for forward rotation of the spindle motor 30, the current will flow through the switch 239 and the conductor 269 to the actuating coil 270 of the forward motor switch 271. The energization of the coil 270 will close the motor switch 271 and consequently the spindle motor will be energized for forward clockwise rotation. Incidentally, the direction of rotation of the spindle motor for inching purposes is immaterial since the meshing of gears will be facilitated by movement in either direction.

Concurrently with the energization of the contact element 331 in the timing relay 332, the control current will flow from the conductor 330 to one of a pair of contacts in the feed motor control relay 246 associated with a contact member 334. Since inching is intended to be used only when the feed motor and spindle motor relays are de-energized, the contact member 334 is arranged to be in closed position whenever the relay 246 is in an open position. Conversely, when the feed motor control relay 246 is in a closed position, the contact bar 334 will be retained in an open position to prevent the energization of the timing relay 332. However, when the contact bar is closed, as shown, current can flow through the bar 334 and a conductor 335 to a coil 336 in the timing relay 332. After a predetermined time interval, the energized coil 336 will effect movement of the contact element 331 within the relay 332 to an open position. Thus the inching circuit to either one of the two spindle motor switches 271 and 274 will be interrupted and consequently the spindle motor will be de-energized. The circuit from the time relay actuating coil 336 is completed through a conductor 337, the conductor 256 and the contact element 257 in the master control relay 230 to the return line 231.

For a single actuation of the inching switch 157, a single time delay opening of the contact element 331 in the timing relay will occur. If the actuating button in the switch 157 is retained in the depressed position, the coil will continue to be energized and after the initial predetermined time interval will retain the contact bar in the open position. To again energize the spindle motor 30 for inching, it is necessary to momentarily release the actuating button of the switch 157 to permit a return of the contact bar in the relay 332 to its normally closed position.

As previously mentioned in connection with the description of the range change shifting mechanism in the vertical type milling machine shown in Fig. 10, a separate inching switch 195 is provided for jogging the range change gearing. This switch is wired in parallel relationship with the inching switch 157 on the column, as indicated in the wiring diagram, and the electrical energization resulting from the actuation of this switch is identical with that previously described in connection with the inching switch 157. Thus when the range change shifter handle 206 is drawn outward to its full extent in effecting a gear shifting operation, the contacts in the inching switch 195 are closed to momentarily effect energization of the spindle motor 30 and thereby aid in the meshing of the range change gears in the vertical spindle head 200.

Electrical protective means are included in each of the three motor circuits in order to protect the three motors and the mechanism associated with them from injurious overloads. Thus in the case of the spindle motor 30, the two thermally controlled overload relays 306 and 310 included in the spindle motor lines are connected in a manner to effect the de-energization of the feed motor in the event of a continuing overload on the spindle motor, such as might be caused by a cutter becoming extremely dull while operating on a work piece. In that case, the feed motor 60 would be de-energized and the cause of the overload on the spindle motor removed.

Likewise, the instantaneous relay 255 connected in the spindle motor circuit serves to open the control circuit from the actuating coil 245 of the feed motor control relay 246 upon the occurrence of a sudden overload. The instantaneous relay 255 is a current relay which is designed to operate in the event of a sudden increase in current flow to the spindle motor 30 beyond a predetermined amount. If this relay is made to operate due to an overload condition, the feed motor relay 246 will open to de-energize the coil 297 of the feed motor switch 298, consequently disconnecting the feed motor 60 from the main supply lines L1, L2 and L3. Thus the spindle motor 30 will continue to operate in order to give the cutter a chance to clear itself. To restart the feed motor 60 it is necessary to actuate either one of the two starting switches 155 or 165, as previously explained.

The feed motor 60 and its mechanical appurtenances are also directly protected, since the two thermally controlled overload relays 301 and 303 in the feed motor circuit serve to de-energize the feed motor in the event of a continuing overload on the feed motor. Thus, if either of the overload relays 301 or 303 is thermally actuated because of a continuing overload, the control circuit through the actuating coil 297 of the feed motor switch 298 will be interrupted and consequently the switch 298 will open and the feed motor 60 will be de-energized. Accordingly, a continuing overload in either the spindle motor 30 or in the feed motor 60 will interrupt the circuit through the actuating coil 297 in the feed motor switch 298 and permit the latter to open. After the motors have been stopped as a result of a continuing overload, the affected overload relay must be manually reset and either one of the starting switches 155 or 165 must be manipulated in the usual manner to effect the re-energization of the spindle and feed motors.

The coolant motor 314 also is protected against a continuing overload such as might occur in the event of a mechanical failure or as the result of an excessive back pressure within the pump. The two thermally operated overload relays 320 and 325 in the coolant motor circuit are disposed to open the coolant motor control circuit and de-energize the actuating coil 322 in the coolant motor switch 323, thereby opening the switch and de-energizing the coolant motor 314. The coolant motor overload relay which caused the control circuit to open must be manually reset before the coolant motor can again be energized.

Figure 12:
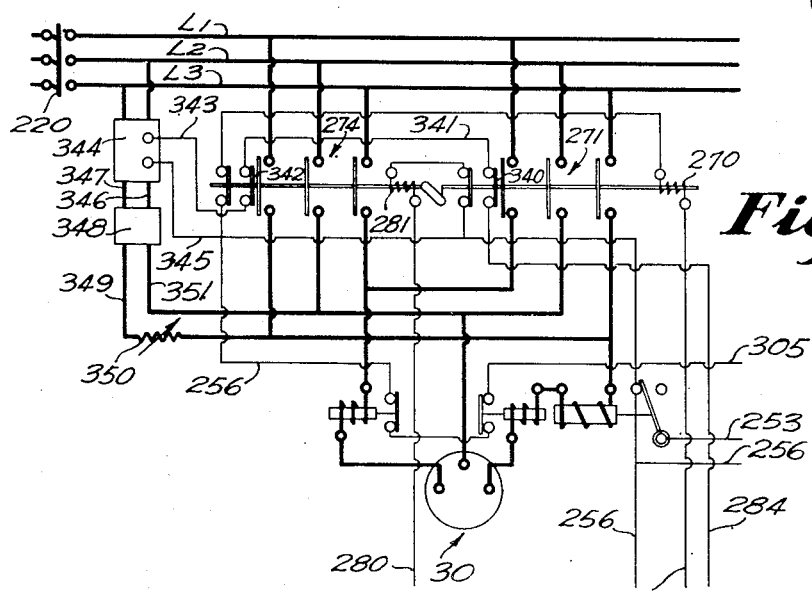
Fig. 12 (Sheet 4) is another schematic circuit diagram illustrating a modification of part of the electrical circuit shown in Fig. 11.

In a modified electrical circuit shown diagrammatically in Fig. 12 on Sheet 4 electrical braking is effected by direct current applied to one phase winding of the spindle motor 30 instead of by plugging action. This arrangement is particularly useful when the spindle and its related transmission is disposed to operate at extremely high speeds since it provides convenient means to control the rate of braking and thereby avoid any possible damage to the rotating mechanism.

The initiation of a braking operation is preceded by the de-energization of the spindle motor as previously explained, since the holding circuit for the spindle motor relay 264 is opened by movement of either of the stop-brake switches 156 or 166 before the brake terminal contacts in these switches can be engaged and the brake circuit energized. Thus, if the forward motor switch 271 were closed to effect forward clockwise rotation of the spindle motor, the initial manipulation of either of the stop-brake switches 156 or 166 will cause the motor switch 271 to open. Movement of either of the stop switches to braking position will result in energizing the conductor 284 from which current will pass through a contact bar 340 associated with a pair of auxiliary contacts in the forward motor switch 271 to a conductor 341 as shown in Fig. 12. The current will then flow through a contact bar 342 associated with another pair of auxiliary contacts in the reverse motor switch 274 to a conductor 343, the two pairs of auxiliary contacts being bridged only when both the switches 271 and 274 are in open position. This conductor is connected to an electronically controlled rectifier 344 from which a conductor 345 extends to the return conductor 256 to complete the rectifier control circuit.

When the electronic element (not shown) within the rectifier 344 is thus energized by the control current, the rectifier is rendered operative through a connection with the main supply lines L2 and L3 and direct current will flow from the rectifier through lines 346 and 347 to a time delay relay 348. The relay 348 serves to permit the current to flow for a predetermined time interval and thereafter opens the circuit. The current will flow from the timing relay through a line 349 to a rheostat 350. The amount of current flow is predeterminately adjusted on the rheostat in order to restrict the effectiveness of the resultant braking action for a given spindle speed. In the slow speed spindle ranges, the full braking current can be utilized to effect substantially instantaneous braking of the spindle motor 30. However, in the high speed spindle ranges it is desirable to restrict this current so as to accomplish the fastest braking possible and yet protect the spindle transmission and the spindle from undue strains.

The rheostat 350 is connected to one of the main lines leading to the spindle motor 30 while a conductor 351 serves to complete the circuit from another of the supply lines to the relay 348. When the direct current is fed into the spindle motor supply lines, both of the motor switches 271 and 274 are in an open position, as previously mentioned. The direct current will pass into one phase of the field winding in the spindle motor 30 and effect a magnetic braking action upon the rotating armature in a well known manner, the direct current being permitted to flow into the motor 30 for a predetermined time interval sufficient to effect the desired amount of braking. In order to prevent excessive heating within the motor, this time interval is always held to a minimum. After the braking circuit has been interrupted, the braking control circuit to the rectifier must also be interrupted before a subsequent braking cycle can be made to occur. This modification in the electrical braking circuit in no way alters the operation of the machine as previously described.

Although the source of direct current for effecting the braking action is shown as being the electronically controlled rectifier 344, it is to be understood that the direct current may be obtained by means of a rectifier of some other type or from an entirely independent source of direct current.

From the foregoing description of an illustrative milling machine and the associated actuating and controlling mechanism constituting an exemplifying embodiment of the present invention, it will be apparent that there has been provided an improved driving and controlling arrangement for a milling machine in which a separate feeding motor on the knee is electrically interlocked with the spindle driving motor and the two motors separately and conjointly controlled in such manner as to provide a conveniently operable and inherently safe actuating and controlling system.

Although the illustrative embodiment of the invention herein set forth has been described in considerable detail in order to make a full disclosure of practical operating mechanism, it is to be understood that the apparatus described is intended to be illustrative only and that the various novel features may be incorporated in other structural forms without departing from the spirit and scope of the invention as defined in the subjoined claims.

The principles of the invention having now been fully explained in connection with the exemplifying apparatus set forth in the foregoing description, we hereby claim as our invention and discovery:

1. In a milling machine of the type having a column, a knee movably mounted on said column, a work supporting table movably mounted on said knee, an electric motor carried by said knee and operatively connected to actuate said table, a cutter carrying spindle rotatably mounted in said column, a transmission mechanism of the adjustable speed type operatively connected to drive said spindle, another electric motor operatively connected to drive said spindle transmission mechanism, a source of electric power connected to operate said motors, control means arranged to energize said spindle motor momentarily for actuating said transmission mechanism to facilitate its adjustment, time limiting means associated with said control means and operative to limit the time of energization of said motor to prevent operation of said transmission mechanism at excessive speed during adjustment, electrical switching means operable to effect reversal of the direction of rotation of said spindle driving motor for reversing said spindle, and switching means operative upon a reversing movement of said reversing switch to disconnect both of said motors from said source of power to obviate unintentional reversal of said spindle.

2. In a machine tool, a driven member, shiftable speed changing mechanism operatively connected to drive said driven member, means to shift said mechanism in effecting speed changing, an electric motor operatively connected to drive said speed changing mechanism, a source of electrical energy for operating said motor, a selectively operable inching switch arranged to connect said energy source to said motor for energizing it to turn said speed changing mechanism for facilitating shifting thereof, and a timing switch arranged to disconnect said energy source from said motor after it has been energized by said inching switch for a predetermined length of time to prevent overspeeding said speed changing mechanism during shifting.

3. In a power transmitting system, a variable speed transmission mechanism, an electric motor operatively connected to drive said transmission mechanism, apparatus arranged to effect adjustment of said mechanism, control means associated with said adjusting apparatus and operative upon an adjusting movement thereof to energize said motor for actuating said mechanism to facilitate its adjustment, and a time limiting device associated with said control means and operative at a predetermined time after energization of said motor to effect de-energization thereof, the arrangement being such that the speed of operation of said mechanism during adjustment thereof may be limited to a predetermined maximum.

4. In a machine tool, a driven member, an adjustable speed changing transmission mechanism operatively connected to drive said member, an actuating lever arranged to effect adjustment of said transmission mechanism, an electric motor operatively connected to drive said transmission mechanism, an inching switch associated with said transmission actuating lever and operative when it is moved in adjusting said transmission to effect inching movement of said motor for turning said transmission to facilitate its adjustment, and a time limiting relay associated with said inching switch and operative to limit the time during which said switch effects movement of said motor to thereby obviate the possibility of said transmission mechanism being turned too rapidly during adjustment.

5. In a machine tool having a driven element, the combination with an adjustable speed changing transmission mechanism operatively connected to drive said driven element, means arranged to effect adjustment of said transmission mechanism, and an electric motor operatively connected to drive said transmission mechanism, of means for actuating said transmission mechanism to facilitate its adjustment including electrical control means actuatable to energize said motor, and timing means operative to limit the period of energization of said motor resulting from an actuation of said energizing means, whereby said motor may be caused to actuate said transmission mechanism only to the extent required to facilitate its adjustment.

6. In a power transmitting system, a transmission mechanism of the adjustable speed type, an electric motor operatively connected to drive said mechanism, means arranged to adjust said mechanism, control means operative to energize said motor to facilitate adjustment of said mechanism, and time limiting means associated with said control means and operative to de-energize said motor at a predetermined time after it is energized by said control means, whereby the maximum speed of operation of said motor during adjustment of said mechanism may be definitely limited.

7. In a machine tool, the combination with a driven member and an adjustable transmission mechanism operatively connected to drive said member, of an electric motor operatively connected to drive said transmission mechanism, actuating means arranged to effect adjustment of said transmission mechanism, electrical control means associated with said actuating means and operative upon an adjusting movement thereof to energize said electric motor, and timing means associated with said electrical control means and operative to limit the time of energization of said motor to that required for jogging said transmission mechanism to facilitate its adjustment.

8. In a machine tool, a base, a cutter supporting spindle rotatably carried by said base, a work supporting member mounted on said base, mechanism operative to effect relative feeding movement between said cutter supporting spindle and said work supporting member, an electric motor operatively connected to drive said feeding mechanism, another electric motor operatively connected to drive said spindle, a source of electric power connected to operate said motors, electrical control apparatus for said motors including a switch operative to reverse the direction of rotation of said spindle motor for reversing said spindle, and switching means operative upon reversing movement of said reversing switch to disconnect both of said motors from said source of power, whereby unintentional reversal of said spindle by inadvertent operation of said reversing switch is prevented.

9. In a milling machine of the knee and column type, a column, a knee slidably mounted on said column, a work supporting table movably carried by said knee, a cutter supporting spindle rotatably carried by said column, an electric motor mounted in said column and operatively connected to drive said spindle, another motor mounted on said knee, transmission mechanism including reversing gearing operatively connecting said knee mounted motor to drive said work supporting table, electrical control means operatively connected to effect energization of said motors substantially simultaneously, an electrical reversing control associated with said spindle driving motor and operative to control the direction of rotation of said spindle, and auxiliary control means associated with said reversing control and operative to de-energize both of said motors upon the occurrence of a reversing action, whereby danger of feeding work on said table into a reversedly rotating cutter in said spindle is minimized.

10. In a milling machine having a cutter spindle and a work supporting table, an electric motor operatively connected to drive said cutter spindle, a separate electric motor operatively connected to effect feeding movements of said work supporting table, a control system for said electric motors including a thermal overload relay associated with each of said motors each relay being operative to stop said feeding motor upon the occurrence of a continuing overload in its associated motor, and an instantaneous overload relay associated with said spindle motor and so connected to said feeding motor as to be operative in response to the occurrence of a sudden overload on said spindle motor to stop said feeding motor while permitting said spindle motor to continue to drive said cutter spindle, whereby an overloaded cutter may clear itself through continued operation without feeding movement.

11. In a milling machine of the type having a column, a knee movably mounted on said column, a work supporting table movably mounted on said knee, an electric motor carried by said knee and operatively connected to actuate said table, a cutter carrying spindle rotatably mounted in said column, a transmission mechanism of the adjustable speed type operatively connected to drive said spindle, another electric motor operatively connected to drive said spindle transmission mechanism, a source of electric power connected to operate said motors, control means arranged to energize said spindle motor momentarily for actuating said transmission mechanism to facilitate its adjustment, time limiting means associated with said control means and operative to limit the time of energization of said motor to prevent operation of said transmission mechanism at excessive speed during adjustment, electrical switching means operable to effect reversal of the direction of rotation of said spindle driving motor for reversing said spindle, switching means operative upon a reversing movement of said reversing switch to disconnect both of said motors from said source of power to obviate unintentional reversal of said spindle, an electrical interlock arranged to stop said feeding motor when said spindle motor stops, transmission mechanism in said knee arranged for selective engagement to provide for operation of said table at rapid traverse rate, and control means associated with said rapid traverse transmission mechanism and operative to energize said table actuating motor when said rapid traverse mechanism is engaged regardless of whether or not said spindle motor is energized.

12. In a machine tool, working elements arranged for relative cutting movements an electric driving motor operatively connected to effect cutting movements between said elements, a source of electric power selectively connectible to energize said motor, stop switch mechanism for controlling said motor including an actuating member resiliently biased to a predetermined inactive position and movable to an active position and to a braking position, relay apparatus associated with said switch mechanism and operative when said actuating member is moved from its inactive position to disconnect said source of electric power from said motor to de-energize it, said relay apparatus remaining in disconnected position when said actuating member is returned to its inactive position, and a braking system associated with said motor and operatively connected to effect braking action in response to movement of said actuating member to a braking position, the arrangement being such that said motor is de-energized for stopping upon moving said actuating member from its inactive position and said braking action is applied as long as said actuating member is held in its braking position.

13. In a milling machine having a cutter spindle and a work table, an electric motor operatively connected to drive said cutter spindle, another electric motor operatively connected to drive said work table, a control system for said motors including reversing apparatus operative to reverse said spindle driving motor for effecting reversal in the direction of spindle rotation, and interlocking means associated with said control system and operative upon actuation of said reversing apparatus to de-energize both of said motors.

14. In a machine tool having a cutter supporting spindle and a work supporting table, transmission mechanism arranged to actuate said table in either direction selectively, a motor operatively connected to drive said transmission mechanism continuously in one direction, a separate motor operatively connected to drive said cutter supporting spindle in either direction selectively, a reversing control system operatively arranged to effect reversal of said spindle driving motor without effecting reversal of said table driving motor, and interlocking means associated with said reversing control system and operative to de-energize both of said motors upon actuation of said reversing control system.

15. In a milling machine, a driven cutter spindle, an electric motor operatively connected to drive said cutter spindle, a control system for said motor including a source of power and a stop switch element, means associated with said stop switch element and operative when said element is moved to stop position to cause said control system to disconnect said motor from said source of power, said means maintaining said motor disconnected when said stop switch element is returned from stop position, and other means associated with said stop switch element and operative when said element is moved to a braking position to cause said control system to apply a braking action to said motor to retard said cutter spindle, said braking action being maintained only while said stop switch element is in braking position, the arrangement being such that the extent of said braking action upon said cutter spindle may be controlled by retaining said stop switch element in braking position for a greater or less length of time in stopping said motor.

16. In a milling machine, the combination with a base and a cutter spindle rotatably mounted on said base, of an electric motor operatively connected to actuate said cutter spindle, a control system for said motor including a motor controlling lever, and switching means associated with said lever and operative when said lever is moved in one direction to effect energization of said motor, said switching means being operative when said lever is moved in the other direction to a predetermined position to effect de-energization of said motor and when said lever is moved a further distance in said other direction to effect a braking action upon said motor for retarding said cutter spindle.

17. In a machine tool, a driven member, a source of power for driving said member, a power transmission mechanism including shiftable speed changing gearing operatively connecting said source of power to said driven member to drive it at selected speed, manually actuatable speed selecting control mechanism connected to effect speed changing shifting of said gearing, and control means including a timing mechanism associated with said speed selecting mechanism and operative upon a speed changing movement thereof to cause said power source to operate said gearing for a predetermined limited time to turn it slowly for facilitating gear shifting.

18. In a machine tool, a driven member, speed changing mechanism operatively connected to drive said driven member at selected speeds, means to adjust said speed changing mechanism, an electric motor connected to drive said speed changing mechanism, an inching control system connected to said motor and operative to energize it for effecting inching movements thereof for facilitating adjustment of said mechanism, and a timing device associated with said inching control system and operative to limit the time during which said motor may be energized by an operation of said inching control system, whereby danger of overspeeding said speed changing mechanism while adjusting it is obviated.

19. In a milling machine of the type having a column, a knee movably mounted on said column, a work supporting table movably mounted on said knee, an electric motor carried by said knee and operatively connected to actuate said table, a cutter carrying spindle rotatably mounted in said column, a transmission mechanism of the adjustable speed type operatively connected to drive said spindle, another electric motor operatively connected to drive said spindle transmission mechanism, a source of electric power connected to operate said motors, electrical switching means operable to effect reversal of the direction of rotation of said spindle driving motor for reversing said spindle, switching means operative upon a reversing movement of said reversing switch to disconnect both of said motors from said source of power to obviate unintentional reversal of said spindle, an electrical interlock arranged to stop said feeding motor when said spindle motor stops, transmission mechanism in said knee arranged for selective engagement to provide for operation of said table at rapid traverse rate, and control means associated with said rapid traverse transmission mechanism and operative to energize said table actuating motor when said rapid traverse mechanism is engaged regardless of whether or not said spindle motor is energized.

20. In a machine tool, a driven member, a speed changing power transmission mechanism operatively connected to drive said driven member, a source of power selectively operable to drive said transmission mechanism, manually operable control means arranged to adjust said speed changing mechanism, means to apply power from said source to said transmission mechanism momentarily, and a time delay relay arranged to limit said momentary power application to a predetermined maximum time, whereby said transmission mechanism may be jogged to facilitate adjustment thereof without danger of damaging said mechanism.

21. In a machine tool, an electric motor, a selective speed changing mechanism connected to be driven by said motor, and electrical control means including a time delay relay arranged to energize said motor for a predetermined short period of time to turn said mechanism slowly for facilitating a speed changing operation.

22. In a machine tool power transmission mechanism, a driven member, speed changing mechanism operatively connected to drive said member, an electric motor connected to drive said speed changing mechanism, manually operable means arranged to adjust said speed changing mechanism, an inching control switch operative to energize said motor for turning said speed changing mechanism to facilitate adjustment thereof by said manually operable means, and a time-delay relay associated with said inching switch and operative to de-energize said motor following energization by said inching switch before it can attain sufficient speed to interfere with said adjusting operation.

23. In a machine tool, a driven member, an electric motor operatively connected to drive said member, a control system for said motor including switch means arranged for selective actuation to apply a braking current to said motor to stop said driven member, and a time delay relay associated with said control system and operative to limit the application of said braking current to a predetermined time interval.

24. In a milling machine of the knee and column type, a column, a knee slidably mounted on said column, a work carrying table movably mounted on said knee, a motor mounted on said knee and operatively connected to drive said work table, a cutter driving spindle rotatably mounted in said column in cooperating relationship with said table, a motor carried by said column and operatively connected to drive said cutter spindle, a controlling actuator for controlling said spindle motor, a source of power for said motors, a control system for said spindle motor including a stop switch operative when said actuator is moved to stop position to disconnect said spindle motor from said source of power and to maintain it disconnected when said actuator is returned from stop position, and other control elements associated with said actuator and operative thereby when said actuator is moved to stop position to apply a braking action to said spindle motor, said braking action continuing only while said actuator is retained in stop position.

25. In a milling machine, a driven cutter spindle, a controlling element for said cutter spindle, an electric motor operatively connected to drive said cutter spindle, a source of power for said motor, a control system for said motor including a stop switch, means associated with said stop switch and operative when said controlling element is moved to stop position to cause said control system to disconnect said motor from said source of power, said means maintaining said motor disconnected when said controlling element is returned from stop position, and other control means associated with said stop switch and operative when said controlling element is moved to stop position to cause said control system to apply a braking action to said motor to retard said cutter spindle, said braking action being maintained only while said controlling element is in stop position, the arrangement being such that the extent of said braking action may be controlled by retaining said controlling element in stop position for a greater or less length of time in stopping said motor.

26. In a machine tool, work and cutter supporting members arranged for relative movement, a plurality of electric motors operatively connected respectively to effect movement of each of said supporting members, control means for starting said motors, and control apparatus arranged to effect a change in connections for reversing one of said motors to change the direction of movement of its connected supporting member, said apparatus operating when actuated for reversal to deenergize the motor to be reversed and another of said motors, whereby said motors require restarting and the possibility of unintended operation of a supporting member in the wrong direction is minimized.

27. In a machine tool having a speed changing power transmission mechanism, an electric motor operatively connected to drive said transmission mechanism, adjusting means arranged to effect speed changing adjustment of said transmission mechanism, and timing control means actuated by said adjusting means and operative to effect momentary energization of said motor to turn said transmission mechanism sufficiently to facilitate speed changing adjustment thereof.

28. In a machine tool having a cutter supporting element and a work supporting member, an electric motor operatively connected to drive said cutter supporting element, another electric motor operatively connected to drive said work supporting member, a control system for said motors including reversing apparatus operative to reverse one of said driving motors for effecting reversal in the direction of cutter operation, and interlocking means associated with said control system and operative upon actuation of said reversing apparatus to deenergize both of said motors.

JOSEPH B. ARMITAGE.
THEODORE F. ESERKALN.
THEODORE A. WETZEL.

REFERENCES CITED

The following references are of record in the file of this patent:

UNITED STATES PATENTS

| Number | Name | Date |
| --- | --- | --- |
| 1,658,242 | Hunter | Feb. 7, 1928 |
| 1,738,646 | Graves | Dec. 10, 1929 |
| 1,796,332 | Johnson | Mar. 17, 1931 |
| 1,828,564 | Hardesty | Oct. 20, 1931 |
| 1,849,847 | Mittnacht | Mar. 15, 1932 |
| 1,938,777 | Nenninger | Dec. 12, 1933 |
| 2,068,840 | Bennett et al. | Jan. 26, 1937 |
| 2,070,808 | Romaine et al. | Feb. 16, 1937 |
| 2,110,173 | Pohl et al. | Mar. 8, 1938 |
| 2,164,884 | Nenninger et al. | July 4, 1939 |
| 2,217,938 | Armitage | Oct. 15, 1940 |
| 2,224,107 | Ridgway | Dec. 3, 1940 |
| 2,345,171 | Armitage et al. | Mar. 28, 1944 |
| 2,349,595 | Martellotti | May 23, 1944 |
| 2,363,934 | Bennett | Nov. 28, 1944 |